(12) United States Patent
Jonna et al.

(10) Patent No.: US 11,645,067 B2
(45) Date of Patent: *May 9, 2023

(54) SYSTEM AND METHOD USING NATURAL LANGUAGE PROCESSING TO SYNTHESIZE AND BUILD INFRASTRUCTURE PLATFORMS

(71) Applicant: BANK OF AMERICA CORPORATION, Charlotte, NC (US)

(72) Inventors: Aruna Jonna, Tamil Nadu (IN); Bhuvaneswar Reddy Velkuri, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,385

(22) Filed: May 10, 2022

(65) Prior Publication Data

US 2022/0269497 A1 Aug. 25, 2022

Related U.S. Application Data

(63) Continuation of application No. 16/933,612, filed on Jul. 20, 2020, now Pat. No. 11,354,110.

(51) Int. Cl.
*G06F 8/65* (2018.01)
*G06F 40/20* (2020.01)

(52) U.S. Cl.
CPC .............. *G06F 8/65* (2013.01); *G06F 40/20* (2020.01)

(58) Field of Classification Search
CPC ...... G06F 8/30; G06F 8/34; G06F 8/36; G06F 8/61; G06F 8/65; G06F 8/70; G06F 8/71; G06F 8/73

See application file for complete search history.

(56) References Cited

U.S. PATENT DOCUMENTS

| | | | |
|---|---|---|---|
| 7,752,159 | B2 | 7/2010 | Nelken et al. |
| 3,032,409 | A1 | 10/2011 | Mikurak |
| 8,639,495 | B2 | 1/2014 | Eggebraaten et al. |
| 9,652,211 | B2 | 5/2017 | Rachamadugu et al. |
| 10,025,583 | B2 | 7/2018 | Butler et al. |

(Continued)

*Primary Examiner* — Duy Khuong T Nguyen
(74) *Attorney, Agent, or Firm* — Moore & Van Allen PLLC; Nicholas C. Russell

(57) ABSTRACT

Embodiments of the invention are directed to a system, method, or computer program product structured for synthesizing and building infrastructure platforms. In some embodiments, the system is structured for performing a natural language synthesis of a proposed upgrade to existing infrastructure platform(s), where the natural language synthesis includes analyzing, using natural language processing, code of the proposed upgrade; generating a trust score indicating a predicted likelihood of success from results of the natural language synthesis; in response to the trust score being above a threshold, identifying, using natural language processing, inactive code in the platform(s); generating a build automation script for deploying the proposed upgrade to create upgraded infrastructure platform(s) that exclude the inactive code; executing the build automation script; capturing data from the build automation script execution; and using the result of the build automation script execution and the captured data to refine the natural language synthesis.

15 Claims, 7 Drawing Sheets

(56) References Cited

U.S. PATENT DOCUMENTS

| | | |
|---|---|---|
| 10,355,922 B1 | 7/2019 | Stienhans |
| 10,620,918 B2 | 4/2020 | Cook et al. |
| 2013/0204837 A1* | 8/2013 | Sabharwal ............ G06F 16/235 |
| | | 707/E17.005 |
| 2013/0219217 A1 | 8/2013 | Seren et al. |
| 2014/0053073 A1 | 2/2014 | Guo et al. |
| 2015/0007160 A1 | 1/2015 | Traill et al. |
| 2015/0186125 A1 | 7/2015 | Avery et al. |
| 2017/0124479 A1 | 5/2017 | Baughman et al. |
| 2017/0262360 A1 | 9/2017 | Kochura et al. |
| 2018/0018634 A1 | 1/2018 | Satagopan et al. |
| 2018/0075013 A1 | 3/2018 | Razack et al. |
| 2019/0163787 A1 | 5/2019 | Andrews et al. |
| 2020/0387357 A1 | 12/2020 | Mathon et al. |
| 2021/0132967 A1* | 5/2021 | Hopkins ............... G06F 16/252 |

\* cited by examiner

SYSTEM AND METHOD USING NATURAL LANGUAGE PROCESSING TO SYNTHESIZE AND BUILD INFRASTRUCTURE PLATFORMS

CROSS-REFERENCE TO RELATED APPLICATION

The present application is a continuation of co-pending U.S. patent application Ser. No. 16/933,612, of the same title and filed on Jul. 20, 2020, which is assigned to the assignee hereof and the contents thereof are hereby expressly incorporated by reference.

BACKGROUND

An entity may operate a system that hosts one or more platforms. The platform(s) may be configured to perform one or more functions. A given platform may also host or partially host a large number of applications, each directed to performing additional and, many times, specialized functions. From time to time, however, the platform(s) may need to be upgraded. For example, an upgrade to a platform may be needed to expand the functions that can be performed by the platform. However, upgrading a platform may be a difficult and lengthy process, particularly when a platform is hosting applications with functions that may be disrupted if there are issues with the platform being upgraded. As such, there is a need for a system that could measure the likelihood of success for a given platform upgrade.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, computer program products, and methods for synthesizing and building infrastructure platforms. In some instances, the system comprises: a memory device with computer-readable program code stored thereon; a communication device; and a processing device operatively coupled to the memory device and communication device, wherein the processing device is configured to execute the computer-readable program code to: perform a natural language synthesis of a proposed upgrade to one or more existing infrastructure platforms, wherein the natural language synthesis comprises analyzing, using natural language processing, code of the proposed upgrade; generate a trust score from results of the natural language synthesis, wherein the trust score indicates a predicted likelihood of success for the proposed upgrade; in response to the trust score being above a threshold, identify, using natural language processing, inactive code in the one or more existing infrastructure platforms; generate a build automation script for deploying the proposed upgrade to create one or more upgraded infrastructure platforms that exclude the inactive code; execute the build automation script; capture data from a result of the build automation script execution; and use the result of the build automation script execution and the captured data to refine the natural language synthesis.

In some embodiments, the invention is further configured to: build an execution plan from the results of the natural language synthesis; and generate a report from the execution plan, wherein the report includes instructions on deploying the proposed upgrade written in plain language, and wherein the build automation script is at least partially based on the report.

In some embodiments, or in combination with any of the previous embodiments, analyzing, using natural language processing, the code of the proposed upgrade comprises: comparing commands used in the code of the proposed upgrade to commands used in the one or more existing infrastructure platforms; determining whether the commands of the proposed upgrade code match the commands of the one or more existing infrastructure platforms; and if one or more commands of the proposed upgrade code do not match the commands of the one or more existing infrastructure platforms, determining how frequently the one or more commands are used in the proposed upgrade code.

In some embodiments, or in combination with any of the previous embodiments, analyzing, using natural language processing, the code of the proposed upgrade comprises: comparing commands used in the code of the proposed upgrade to commands used in the one or more existing infrastructure platforms; determining whether permissions of the proposed upgrade commands match permissions of the existing infrastructure platform commands; and if one or more permissions of the proposed upgrade commands do not match the permissions of the existing infrastructure platform commands, determining how frequently the one or more permissions are used in the proposed upgrade code.

In some embodiments, or in combination with any of the previous embodiments, analyzing, using natural language processing, the code of the proposed upgrade comprises: comparing database connections in the code of the proposed upgrade to database connections in the one or more existing infrastructure platforms; determining whether the database connections of the proposed upgrade code match the database connections of the one or more existing infrastructure platforms; and if one or more database connections of the proposed upgrade code do not match the database connections of the one or more existing infrastructure platforms, determining a ratio of the one or more database connections to a total number of database connections of the proposed upgrade code.

In some embodiments, or in combination with any of the previous embodiments, analyzing, using natural language processing, the code of the proposed upgrade comprises: determining a list of third-party products included on the one or more existing infrastructure platforms; for each third-party product, determining whether a same version, a lesser version, or a higher version of the third-party product is included in the proposed upgrade; if the same version or the higher version of one or more third-party products is included in the proposed upgrade, determining whether the one or more third-party products are compatible with the code of the proposed upgrade; and if at least one of the one or more third-party products is not compatible with the code of the proposed upgrade, determining how frequently the at least one third-party product is used in the proposed upgrade code compared to how frequently the at least one third-party product is used in the one or more existing infrastructure platforms.

In some embodiments, or in combination with any of the previous embodiments, generating the trust score from the results of the natural language synthesis comprises: determining, based on the results of the natural language synthesis, whether the code of the proposed upgrade meets a plurality of weighted criteria, wherein each weighted criterion is associated with a weighted value; and using the weighted values of the met criteria to generate the trust score.

In some embodiments, or in combination with any of the previous embodiments, capturing the data from the result of the build automation script execution comprises, in response to one or more post-deployment errors in the deployment of the proposed upgrade, capturing the one or more post-deployment errors and one or more parameters of the proposed upgrade that caused the one or more post-deployment errors.

In some embodiments, or in combination with any of the previous embodiments, capturing the data from the result of the build automation script execution comprises, in response to the deployment of the proposed upgrade being a success, capturing one or more parameters of the proposed upgrade relating to the success.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
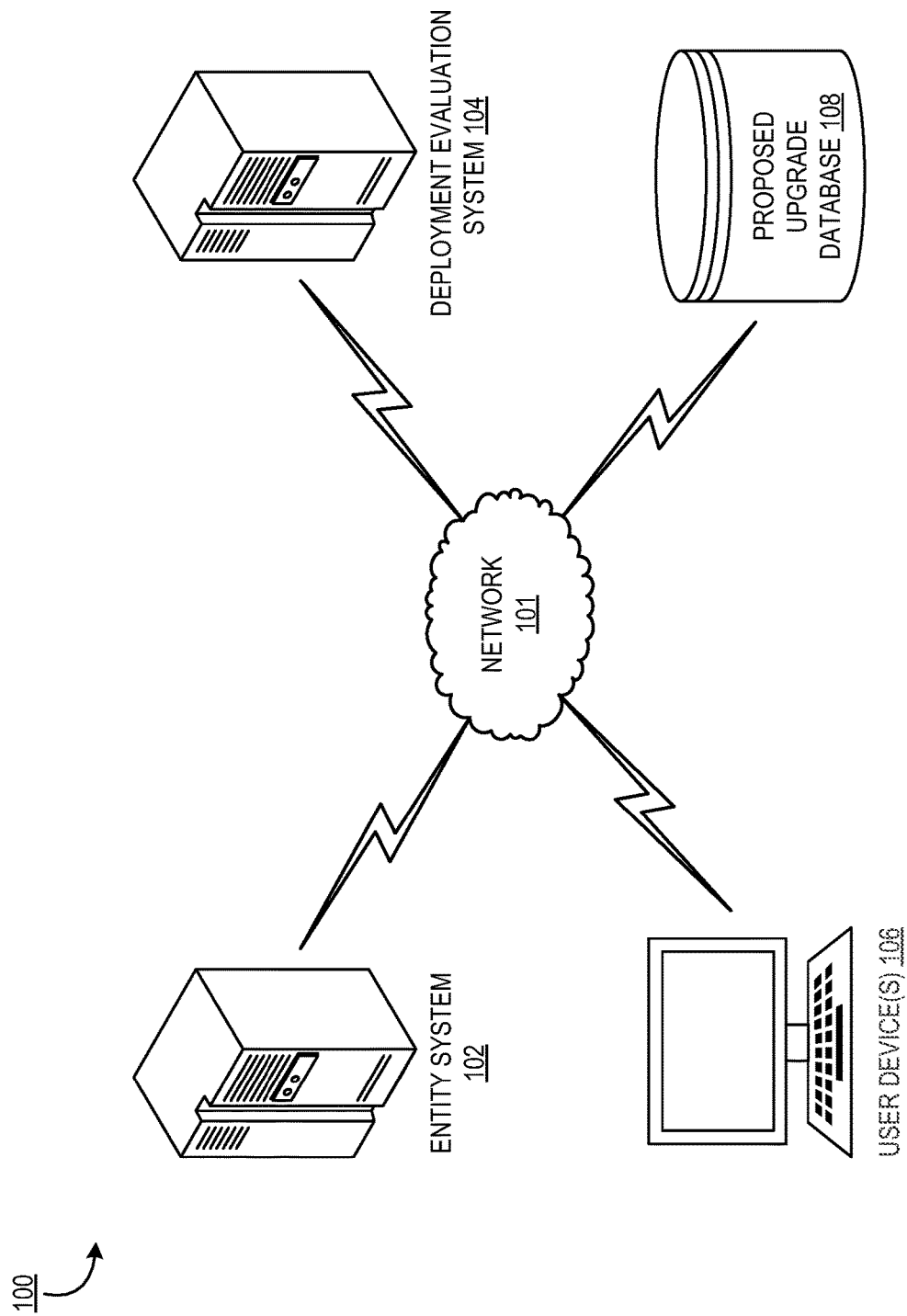
Figure 2:
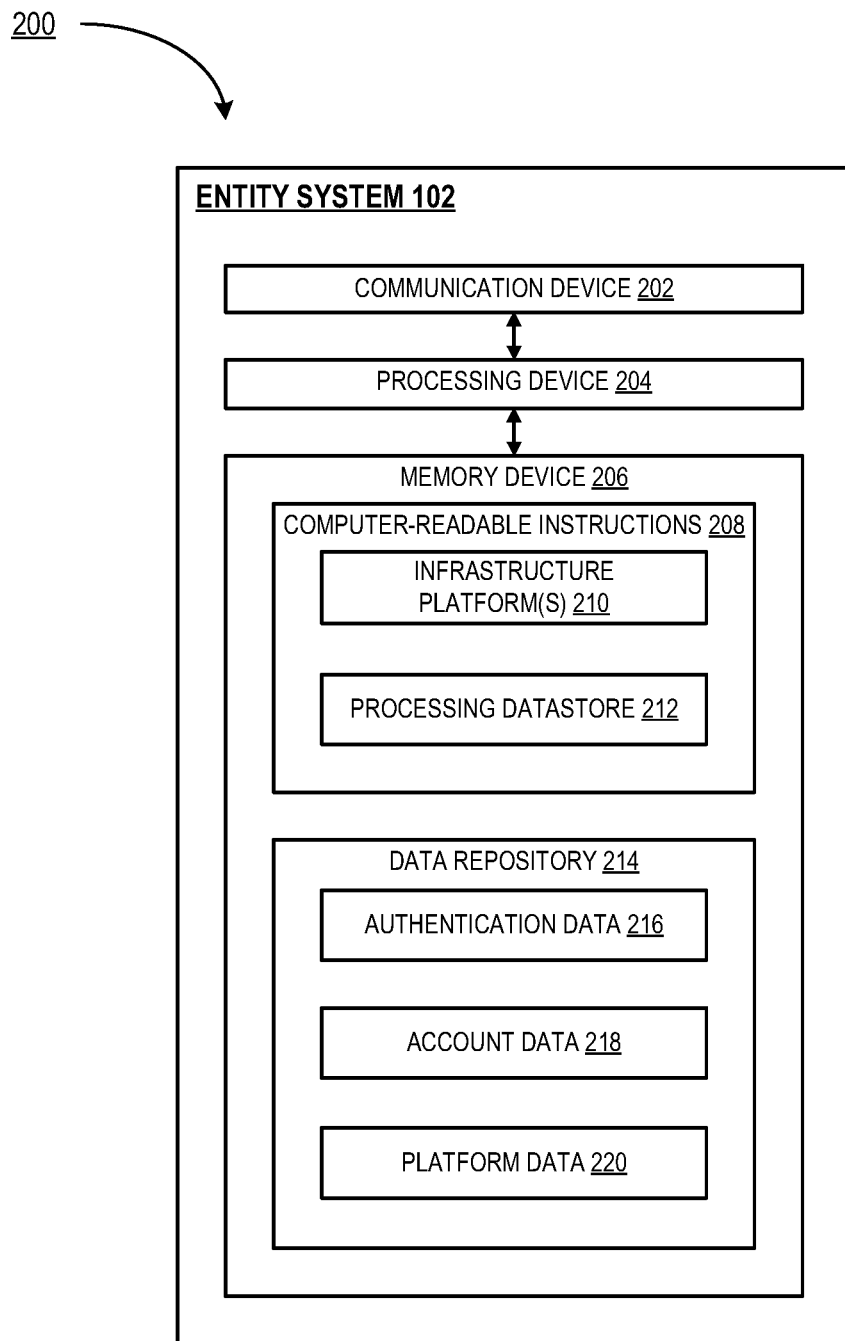
Figure 3:
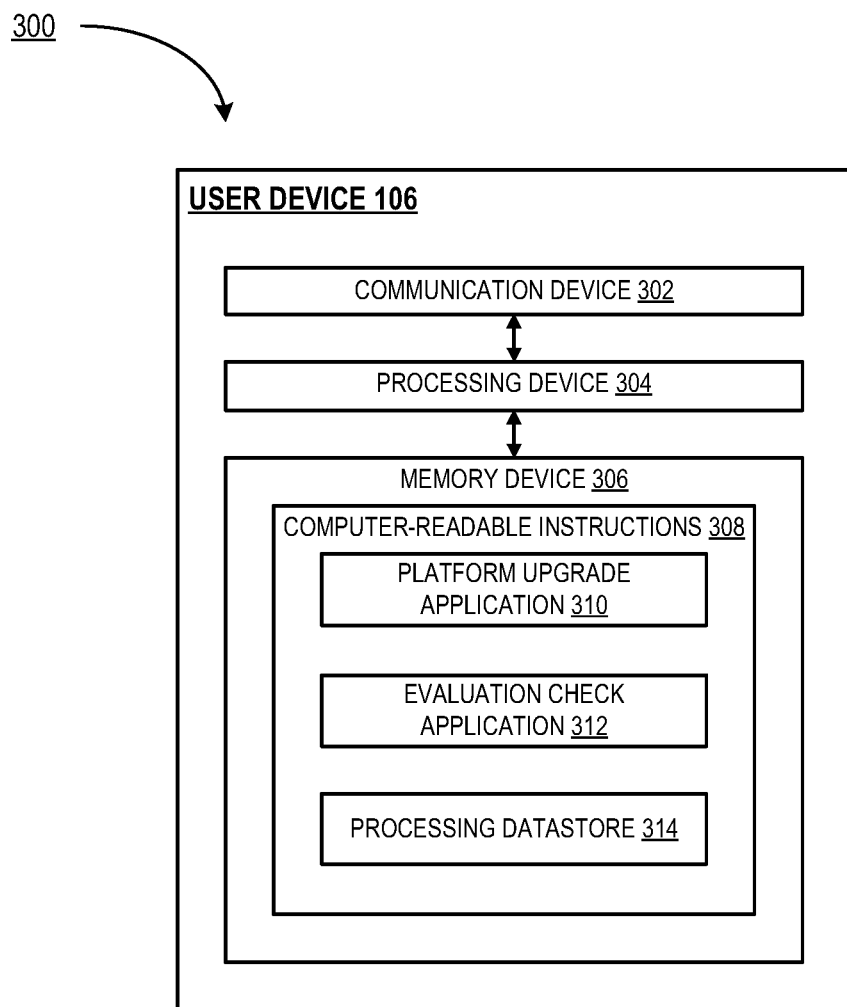
Figure 4:
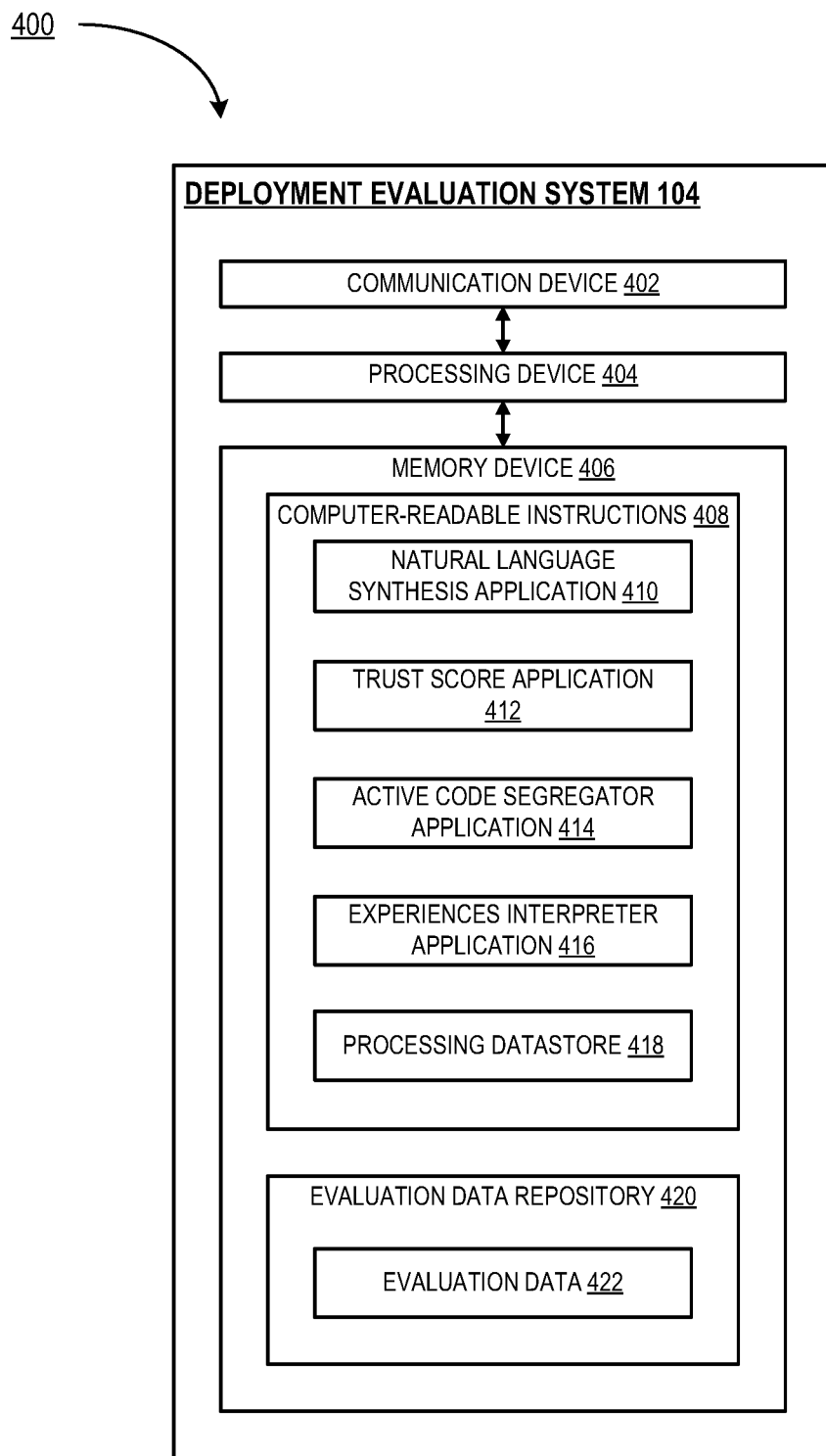
Figure 5:
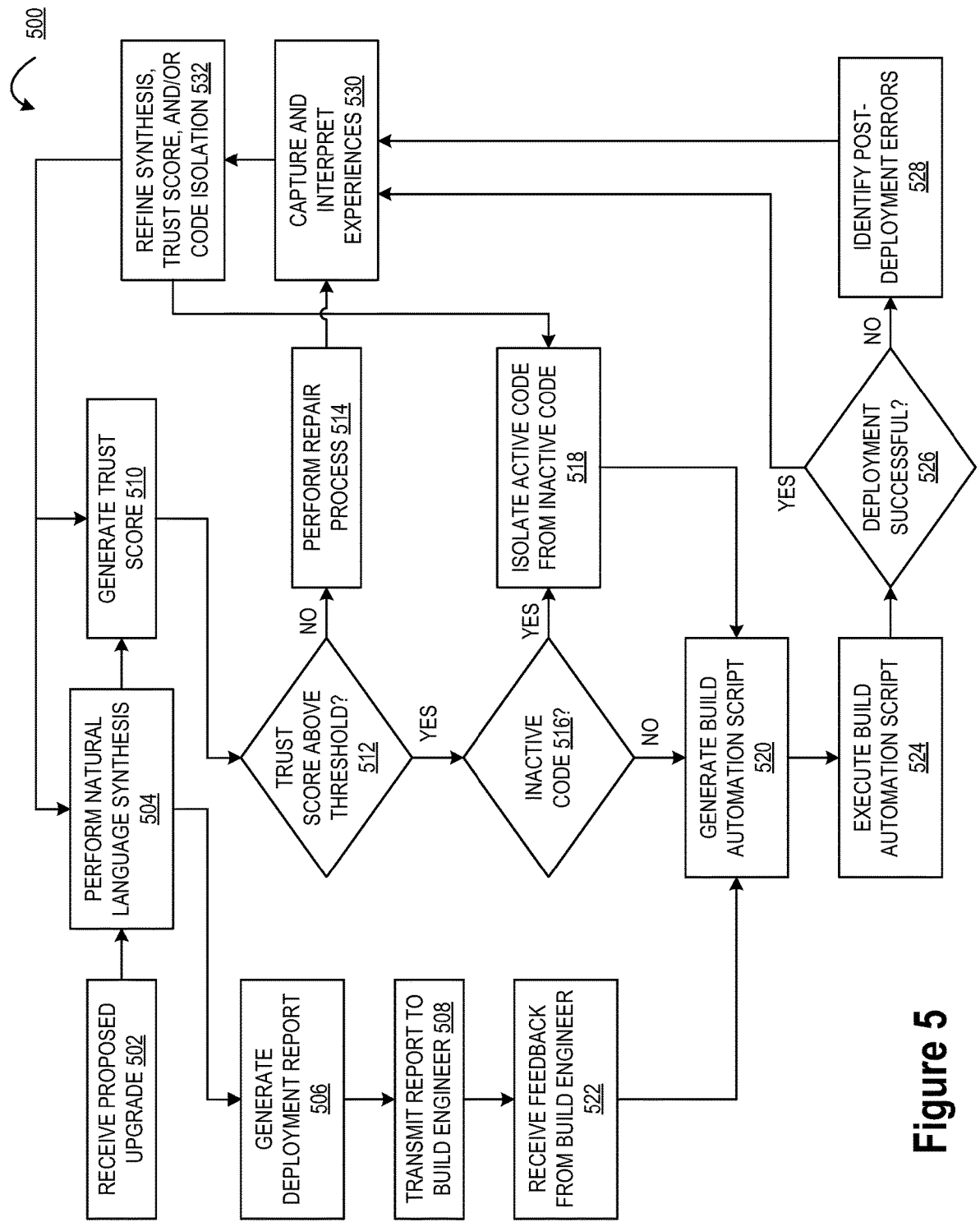
Figure 6:
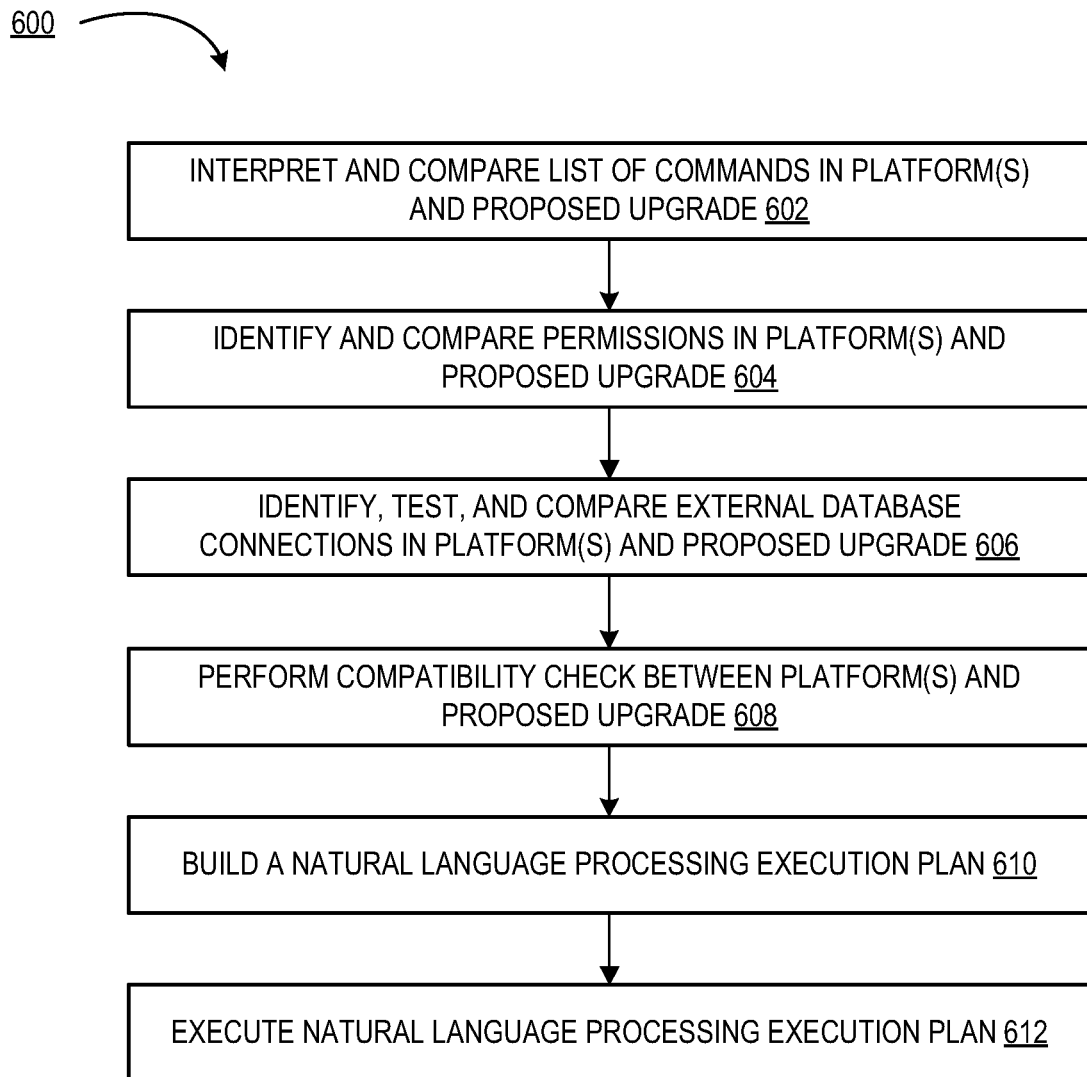
Figure 7:
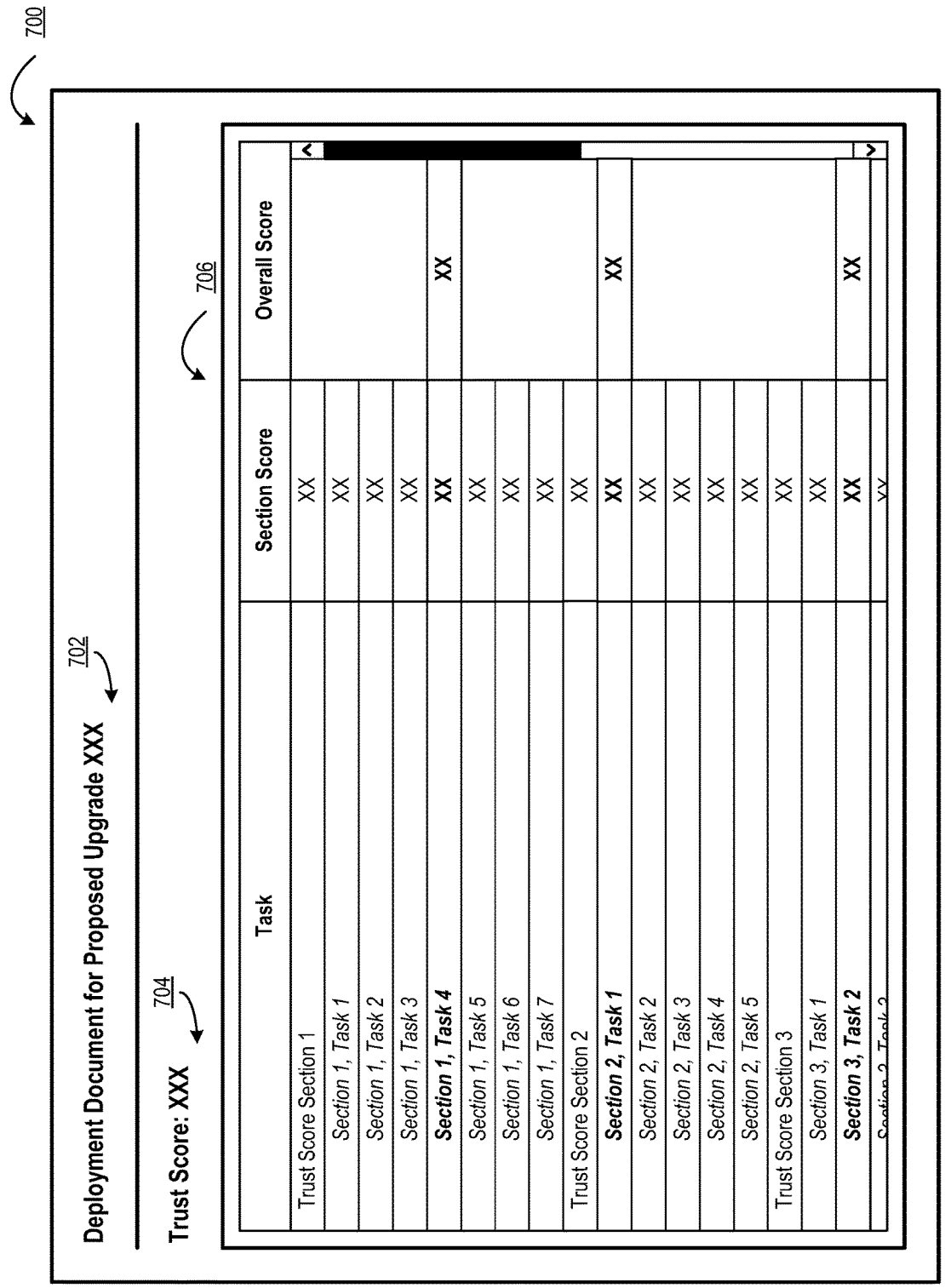

Having thus described embodiments of the invention in general terms, reference will now be made to the accompanying drawings, where:

FIG. 1 illustrates a block network architecture diagram illustrating a system environment 100 for synthesizing and building infrastructure platforms, in accordance with some embodiments of the invention;

FIG. 2 illustrates a block diagram 200 of an entity system, in accordance with some embodiments of the invention;

FIG. 3 illustrates a block diagram 300 of a user device, in accordance with some embodiments of the invention;

FIG. 4 illustrates a block diagram 400 of a deployment evaluation system, in accordance with some embodiments of the invention;

FIG. 5 illustrates a high-level process flow 500 for synthesizing and building infrastructure platforms, in accordance with some embodiments of the invention;

FIG. 6 illustrates a high-level process flow 600 for performing a natural language synthesis of a proposed upgrade, in accordance with some embodiments of the invention; and FIG. 7 illustrates a representation of a graphical user interface 700 for display on a user device, in accordance with some embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution employing information technology resources and, particularly, technology infrastructure configured for large scale processing of electronic files, electronic technology event data, and records, as well as performing/processing associated technology activities. In some instances, the entity's technology systems comprise multiple technology applications across multiple distributed technology platforms for large scale processing of technology activity files and electronic records. As such, the entity may be any institution, group, association, financial institution, merchant, establishment, company, union, authority, or the like, employing technology resources.

As described herein, a "user" is an individual associated with an entity. In some embodiments, a "user" may be an employee (e.g., a build engineer, a technology operator/technician, an associate, a project manager, an information technology (IT) specialist, a manager, an administrator, an internal operations analyst, or the like) of the entity or enterprise affiliated with the entity who is capable of operating the systems described herein. In some embodiments, a "user" may not be a direct employee of the entity but rather an indirect employee, such as a contractor or third-party services provider. In some embodiments, a user may be or include a system performing one or more tasks described herein.

A "customer" is an individual, group, or system associated with the entity. In some embodiments, a customer may be an individual, group, or system having past relationships, current relationships, or potential future relationships with an entity. For example, in the instances where the entity is a resource entity or a merchant, financial institution, or the like, a customer may be an individual, group, or system with one or more relationships, affiliations, or accounts with the entity (e.g., the merchant, the financial institution, or the like). In some instances, a customer may not be a direct customer of the entity but may instead be any individual, group, or system who has a relationship with the direct customer of the entity.

A "technology resource" or "account" may be the relationship that the customer has with the entity. Examples of technology resources include a deposit account, such as a transactional account (e.g. a banking account), a savings account, an investment account, a money market account, a time deposit, a demand deposit, a pre-paid account, a credit account, customer information, or the like. The technology resource or account may be associated with and/or maintained by an entity. The technology resource or account may also be associated with technology infrastructure such that the resource or account may be accessed, modified, or acted upon by the customer electronically, for example, using transaction terminals, user devices, merchant systems, and the like. In some embodiments, the entity may provide one or more technology instruments or financial instruments to the customer for executing resource transfer activities or financial transactions. In some embodiments, the technology instruments/financial instruments, like electronic tokens, credit cards, debit cards, checks, loyalty cards, user device applications, account identifiers, routing numbers, passcodes, and the like, may be associated with one or more resources or accounts of the customer. In some embodiments, the entity may represent a vendor or a merchant with whom the customer engages in financial transactions (e.g., resource transfers like purchases, payments, returns, enrolling in merchant accounts and the like) or non-financial transactions (for resource transfers associated with loyalty programs and the like), either online or in physical stores or merchant locations.

As used herein, a "user interface" may be an interface for user-machine interaction. In some embodiments, the user interface comprises a graphical user interface (GUI). A GUI is a type of user interface that allows users to interact with electronic devices via graphical icons and visual indicators, such as graphical widgets, graphical icons, and visual indicators (e.g., secondary notation), as opposed to using only text via the command line. In some instances, a GUI may include both graphical elements and text elements. A GUI may also incorporate one or more elements that facilitate communication using one or more communication mediums, such as tactile communication (e.g., communication via a touchscreen, keyboard, and the like), audio communication, textual communication, and/or video communication (e.g., gestures detected by a camera). That said, the GUIs may be configured for audio, visual, and/or textual communication, and may be configured to receive input and/or provide output using one or more user device components and/or external auxiliary/peripheral devices such as a display, a speaker, a microphone, a touchscreen, a camera, a GPS device, a keypad, a mouse, and/or the like. The graphical user interface may be configured to be presented on one or more display devices associated with user devices, entity systems, auxiliary user devices, processing systems, and the like.

An electronic activity, also referred to as a "technology activity" or a "customer activity," such as a "resource transfer" or "transaction," may refer to any activities or communications between a customer or entity and a financial institution, between the customer and the entity, activities or communication between multiple entities, communication between technology applications, and the like. A resource transfer may refer to a payment, a processing of funds, a purchase of goods or services, a return of goods or services, a payment transaction, a credit transaction, or other interactions involving a customer's resource or account. In the context of a financial institution or a resource entity such as a merchant, a resource transfer may refer to one or more of: a transfer of resources/funds between financial accounts (also referred to as "resources"), a deposit of resources/funds into a financial account or resource (e.g., depositing a check), a withdrawal of resources or funds from a financial account, a sale of goods and/or services, initiating an automated teller machine (ATM) or online banking session, an account balance inquiry, a rewards transfer, opening a bank application on a customer's computer or mobile device, a user accessing their e-wallet, applying one or more coupons to purchases, or any other interaction involving the customer and/or a customer's personal device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments (e.g., paying monthly bills and the like); loading money onto stored value cards (SVCs) and/or prepaid cards; donating to charities; and/or the like. Unless specifically limited by the context, a "resource transfer," a "transaction," a "transaction event," or a "point of transaction event" may refer to any customer activity (financial or non-financial activity) initiated between a customer and a resource entity (such as a merchant), between the customer and a financial institution, or any combination thereof.

In accordance with embodiments of the invention, the term "electronic communication" may refer to a communication associated with a user or with a customer, typically received, viewed, and/or transmitted via a communication channel. In some embodiments, electronic communications may be associated with user and/or customer communications relating to travel, appointments, etc. (e.g., non-financial communications). In some embodiments, electronic communications may be associated with user and/or customer communications relating to user financial statements (e.g., savings statements, shareholder notices, etc.), bill payments, account notifications, communications requiring actions to be performed by the user or customer, communications triggering resource/account activities, documents to be signed by the user or customer, etc. (e.g., financial communications). In some embodiments, communication channels may comprise cellular, audio, email, cellular messaging, website, mobile application notifications, and the like.

Under current systems and methods, an entity may operate a system that has one or more infrastructure platforms that are configured to perform one or more functions, including hosting various applications. Each application may be directed to performing one or more additional functions, which may also be specialized functions. Applications may be deployed on the infrastructure platform(s) by the entity or by partners of the entity, such as merchant partners in electronic communication with systems of the entity. In some cases, infrastructure platform(s) may host a large number of applications, for example, more than one hundred applications on a given platform. Additionally, a platform may also operate through the use of a large number of scripts. As an illustration, a platform may include over 10,000 scripts. Some of these scripts may be inactive, for instance, due to changing uses of the platform or due to previous upgrades to the platform that have rendered older scripts obsolete.

From time to time, a platform may need to be upgraded. For example, upgrading a platform may allow the platform to perform new functions and/or host more or different types of applications. Upgrading a platform may also be used to address issues in the platform, such as security issues or compatibility issues. However, upgrading a platform may be complicated by the functions that the platform performs and the applications that the platform hosts. More specifically, if a platform upgrade is unsuccessful or results in one or more errors, the functionality of the platform may be disrupted, which may in turn disrupt the functionality of the applications hosted on the platform. As such, platform upgrades may take a long time to perform, such as over a year, as build engineers test the proposed upgrade and verify that the platform will still be operational when the upgrade is deployed. Additionally, the time that a platform upgrade takes may be artificially inflated by application owners who seek reassurance that the platform upgrade will not disrupt the functionality of their applications.

Further, as noted above, a platform may include a large amount of inactive and obsolete code. However, due to the large number of scripts used to create a platform and the large number of hours it would take to review all of them, it may be nearly impossible for a build engineer to identify the inactive code from the active code. Additionally, deploying a proposed upgrade may require experienced build engineers to perform large numbers of tasks, as the deployment process may be too difficult for less experienced engineers to take on.

Accordingly, embodiments of the present disclosure are directed to a system and a method for using natural language processing to synthesize and build infrastructure platforms. More specifically, a deployment evaluation system may perform a natural language synthesis on the code of a proposed upgrade to identify various components of the code, such as executable commands, permissions, external database connections, and the like. The natural language synthesis may also include simulating an execution of the proposed upgrade. The deployment evaluation system may then use the results of the natural language synthesis to output a trust score indicating a predicted likelihood that the proposed upgrade will be a success. If the trust score is too low, the deployment evaluation system may initiate a repair process to attempt to fix at least some of the issues causing the low score. On the other hand, if the trust score is high enough, the deployment evaluation system may again use natural language processing to identify active code from inactive code in the target platform(s) to be upgraded. The deployment evaluation system may then generate a script or a series of scripts that will facilitate the deployment of the proposed upgrade while omitting the identified inactive code. Additionally, the deployment evaluation system may simulate a deployment of the proposed upgrade and, from the simulation results, generate a deployment report detailing recommended actions the should be performed in deploying a proposed upgrade, where the report is written in plain, less technical language. The report may be sent to a build engineer, who may perform at least some of the recommended actions, as well as used in generating the deployment script.

Regardless of whether the deployment is a success or a failure, the deployment evaluation system may use the results of the deployment to determine what aspects of the proposed upgrade caused the success or failure. The deployment evaluation system may also examine proposed upgrades with low trust scores to determine what caused the low trust score. This data may all be fed back into the processes of performing the natural language synthesis, generating the trust score, identifying the inactive code, and the like, in order to more accurately predict the likelihood of successfully deploying future upgrades and to generate better and more complete deployment reports.

As such, the systems described herein provide a user with a metric and prediction of whether a new build or upgrade is likely to succeed or fail in advance. In turn, this may allow the system and/or the user to redress and reduce multiple failures via proactive recognition of issues and remediation. Additionally, the systems described herein may provide real-time notifications of detected issues, such as compatibility issues, to the build engineers or other users preparing the upgrade. Both the metric and the ability to identify and address predicted failures in advance may increase the trust that owners of applications hosted on the platform may have with the proposed upgrade. Therefore, all of this may result in lowered testing times and faster upgrade deployment, such as upgrades occurring in three months. With faster upgrades that have fewer issues, a platform may therefore be made more functional, more compatible, and more secure. The systems described herein may also remove some of the need for build engineers to perform manual review of commands and scripts, thereby allowing them to perform other tasks, such as working on additional future upgrades.

Moreover, as noted above, the systems described herein include automatic identification of inactive code, a function that could not feasibly be performed by a user. Thus, an upgrade to a platform may migrate only active code to the new environment. This may free up storage space for other functions in the server systems on which the platform(s) are operated. In addition, as also discussed above, the systems described herein may output deployment reports that are written in easy-to-understand language such that less experienced build engineers may carry out recommended actions provided therein. With less experienced engineers better able to work on upgrades, this may allow an upgrade to be further deployed more quickly and with potentially improved functionality, as more experienced build engineers may then be available to work on the more difficult aspects of the proposed upgrade.

Referring to FIG. 1, a block diagram illustrating a system environment configured for synthesizing and building infrastructure platforms is illustrated, in accordance with some embodiments of the invention. As illustrated, the system environment 100 includes an entity system 102 in operative communication with a deployment evaluation system 104 and a user device 106. As such, the entity system 102, the deployment evaluation system 104, and the user device 106 are configured to send data to and receive data from each other, such as data relating to predicting how successful a proposed platform upgrade will be and determining a plan for deploying the upgrade. The system environment also includes a proposed upgrade database 108 with which the entity system 102, the deployment evaluation system 104, and the user device 106 may electronically communicate.

Typically, the entity system 102, the deployment evaluation system 104, the user device 106, and the proposed upgrade database 108 are in electronic communication with each other via the network 101, which may be the internet, an intranet, or the like. The network 101 is configured to establish an operative connection between otherwise incompatible devices, for example, by establishing a communication channel, automatically and in real time, between the entity system 102, the deployment evaluation system 104, the user device 106, and/or the proposed upgrade database 108. In this regard, the wireless communication channel may further comprise near field communication (NFC), communication via radio waves, communication through the internet, communication via electromagnetic waves, and the like. In FIG. 1, the network 101 may include a local area network (LAN), a wide area network (WAN), a global area network (GAN), and/or a near field communication (NFC) network. Accordingly, the network 101 may provide for wireline, wireless, or a combination of wireline and wireless communication between devices in the network 101.

The entity system 102 is associated with the entity and configured to operate one or more infrastructure platforms adapted to perform one or more functions, including hosting applications created by users of the entity and/or third-parties associated with the entity. Additionally, the entity system 102 may store information relating to the relationship a customer has with the entity, such as customer account information. The components of the entity system 102, its features, and its functions will be described in further detail below and with respect to FIG. 2, in particular.

The deployment evaluation system 104 is configured to evaluate the likelihood that a proposed upgrade to a platform or platforms of the entity system 102 will be successful. As such, the deployment evaluation system 104 is configured to gather information about the proposed upgrade from the proposed upgrade database 108, as well as information about the platform(s) being upgraded from the entity system 102. Additionally, if the predicted likelihood of success is high enough, the deployment evaluation system 104 is configured to determine a plan for deploying the proposed upgrade and for facilitating the proposed upgrade. The components of the deployment evaluation system 104, its features, and its functions will be described in further detail below and with respect to FIG. 4, in particular.

A user device 106 may comprise a personal computing device, such as a desktop computer or laptop computer. Alternatively, in some cases, the user device 106 may comprise a mobile communications device, such as a cellular telecommunications device (e.g., a smartphone or mobile phone), a personal digital assistant (PDA), a mobile internet accessing device, or the like. The user device 106 is configured to connect to the network 101, as well as transmit and receive information over the network 101. As an illustration, the user device 106 may be used to construct the proposed upgrade, in whole or in part, and store the proposed upgrade in the proposed upgrade database 108 (e.g., store scripts configured to operate the proposed upgrade when executed). As another illustration, the user device 106 may receive information from the deployment evaluation system 104, such as a report on a likelihood of success of the proposed upgrade or a deployment report describing actions that should be performed, either by the user or by a system (e.g., the deployment evaluation system), in order to make the proposed upgrade ready for deployment. The components of the user device 106, its features, and its functions will be described in further detail below and with respect to FIG. 3, in particular.

The proposed upgrade database 108 is configured to store a proposed upgrade to one or more infrastructure platforms of the entity system 102. For instance, as discussed above, the entity system 102 may operate one or more software infrastructure platforms configured to perform certain functions. However, an upgrade to one or more platform may be needed in order to expand the functions performed by the platform(s), address compatibility issues in the platform(s), address security issues in the platform(s) or otherwise generally improve the security of the platform(s), and so on. Thus, the proposed upgrade (e.g., computer-readable code, including executable commands), as well as information about the proposed upgrade (e.g., metadata on the proposed upgrade), may be stored in the proposed upgrade database 108. For example, in some cases, the proposed upgrade database 108 may store permissions needed to operate the proposed upgrade, information on external databases used by the proposed upgrade, compatibility information for the proposed upgrade (e.g., which versions of third-party software are used in the proposed upgrade), and/or the like. In some instances, the proposed upgrade database 108 may be a single data storage unit, as shown in FIG. 1, while in other instances, the proposed upgrade database 108 may be comprised of one or more networked data storage units.

FIG. 2 illustrates a block diagram 200 of the entity system 102, in accordance with some embodiments of the invention. As illustrated in FIG. 2, the entity system 102 may include a communication device 202, a processing device 204, and a memory device 206 having one or more infrastructure platform(s) 210 and a processing datastore 212 stored therein. As shown, the processing device 204 is operatively connected to and configured to control and cause the communication device 202 and the memory device 206 to perform one or more functions. In some embodiments, the infrastructure platform(s) 210 comprises computer-readable instructions or computer-readable code that when executed by the processing device 204 cause the processing device 204 to perform one or more functions that, together, create the operable infrastructure platform(s). For example, the infrastructure platform(s) 210 may include a computer-readable program code having one or more executable portions. It will be understood that the infrastructure platform(s) 210 may be executable to initiate, perform, complete, and/or facilitate one or more portions of any embodiments described and/or contemplated herein.

The communication device 202 may generally include a modem, server, transceiver, and/or other device for communicating with other devices on the network 101. In some embodiments, the communication device 202 may be a communication interface having one or more communication devices configured to communicate with one or more devices on the network 101, such as the deployment evaluation system 104, the user device 106, and the proposed upgrade database 108. The communicative connection to one or more devices on the network 101 may be via a wired or wireless connection. In this regard, the wireless communication channel may comprise near field communication (NFC), communication via radio waves, communication through the internet, communication via electromagnetic waves, communication via applicable cellular systems of wireless telephone networks, and the like.

Additionally, referring to the entity system 102 illustrated in FIG. 2, the processing device 204 may generally refer to a device or combination of devices having circuitry used for implementing the communication and/or logic functions of the processing device 204. For example, the processing device 204 may include a control unit; a digital signal processor device; a microprocessor device; and various analog-to-digital converters, digital-to-analog converters, and other support circuits and/or combinations of the foregoing. Control and signal processing of the entity system 102 may be allocated between these processing devices according to their respective capabilities. The processing device 204 may further include functionality to operate one or more software programs based on computer-readable instructions 208 thereof, which may be stored in the memory device 206.

As the phrase is used herein, a processing device may be "configured to" perform a certain function in a variety of ways, including, for example, by having one or more general-purpose circuits perform the function by executing particular computer-executable program code embodied in a computer-readable medium and/or by having one or more application-specific circuits perform the function. The processing device 204 may be configured to use the network communication interface of the communication device 202 to transmit and/or receive data and/or commands to and/or from the other devices/systems connected to the network 101.

The memory device 206 within the entity system 102 may generally refer to a device or combination of devices that store one or more forms of computer-readable media for storing data and/or computer-executable program code/instructions. For example, the memory device 206 may include any computer memory that provides an actual or virtual space to temporarily or permanently store data and/or commands provided to the processing device 204 when it carries out the functions described herein.

The entity system 102 may further include a data repository 214 comprising authentication data 216, account data 218, and platform data 220. The processing device 204 may utilize the authentication data 216 to validate authentication credentials of customers attempting, for example, to check a balance of an account held with the entity. The account data 218 may reflect current account or technology resource data for various customers of the entity. Alternatively, the entity system 102 may store different account data 218 that a user or customer of the entity may request to access, such as employment information that an employee user may attempt to access.

The platform data 220 includes data on the infrastructure platform(s) 210. For example, the platform data 220 may include computer-readable code that is executed to generate the infrastructure platform(s) 210. This may include a list of executable commands included in the computer-readable code. Alternatively or additionally, the platform data 220 may include metadata on the infrastructure platform(s) 210; data on the operation of the infrastructure platform(s) 210, such as permissions needed to operate the infrastructure platform(s) 210 and information on external databases used by the infrastructure platform(s) 210; compatibility information for the infrastructure platform(s) 210; and/or the like.

In some embodiments, the infrastructure platform(s) 210 may comprise computer-readable instructions associated with one or more infrastructure platforms that perform one or more functions. Each infrastructure platform may also host one or more applications, where each application performs additional functions and/or supplements the functions of the infrastructure platform. An application may be provided by sources internal to the entity (e.g., developed by build engineers of the entity) or provided by a third party (e.g., a merchant partner of the entity). Alternatively, in some embodiments, the infrastructure platform(s) 210 may be stored in the processing datastore 212. In some embodiments, the infrastructure platform(s) 210 comprise computer-readable instructions that, when executed by the processing device 204, cause the processing device 204 to perform one or more functions and/or transmit control instructions to other components or devices to generate the one or more infrastructure platforms. The infrastructure platform(s) 210 may be implemented as a centralized module as shown in FIG. 2, in some instances, or the infrastructure platform(s) 210 may be implemented as a series of connected applications, software architectures, and/or the like that together form the infrastructure platform(s), in other instances.

FIG. 3 illustrates a block diagram 300 of the user device 106, in accordance with some embodiments of the invention. As illustrated in FIG. 3, the user device 106 may include a communication device 302; a processing device 304; and a memory device 306 having an platform upgrade application 310, an evaluation check application 312, and a processing datastore 314 stored therein. As shown, the processing device 304 is operatively connected to and configured to control and cause the communication device 302 and the memory device 306 to perform one or more functions. In some embodiments, the platform upgrade application 310 and/or evaluation check application 312 comprises computer-readable instructions or computer-readable code that when executed by the processing device 304 cause the processing device 304 to perform one or more functions. For example, the platform upgrade application 310 and/or evaluation check application 312 may include computer-readable program code having one or more executable portions. It will be understood that the platform upgrade application 310 and/or evaluation check application 312 may be executable to initiate, perform, complete, and/or facilitate one or more portions of any embodiments described and/or contemplated herein.

The communication device 302 may generally include a modem, server, transceiver, and/or other device for communicating with other devices on the network 101. In some embodiments, the communication device 302 may be a communication interface having one or more communication devices configured to communicate with one or more devices on the network 101, such as the entity system 102, the deployment evaluation system 104, and the proposed upgrade database 108. As such, the communicative connection of the communication device 302 may be a wired or wireless connection similar to the implementation of the communication device 202 of the block diagram 200 of the entity system 102.

Referring to the user device 106 illustrated in FIG. 3, the processing device 304 may generally refer to a device or combination of devices having circuitry used for implementing the communication and/or logic functions of the processing device 304. In this way, the processing device 304 may be configured similarly to the processing device 204 of the block diagram 200 of the entity system 102. Additionally, the processing device 304 may further include functionality to operate one or more software programs based on computer-readable instructions 308 thereof, which may be stored in the memory device 306, such as the platform upgrade application 310 and the evaluation check application 312. The processing device 304 may be configured to use the network communication interface of the communication device 302 to transmit and/or receive data and/or commands to and/or from the other devices/systems connected to the network 101, similar to the processing device 204 of the entity system 102.

The memory device 306 within the user device 106 may generally refer to a device or combination of devices that store one or more forms of computer-readable media for storing data and/or computer-executable program instructions. For example, the memory device 306 may include any computer memory that provides an actual or virtual space to temporarily or permanently store data and/or commands provided to the processing device 304 when it carries out the functions described herein, similar to the memory device 206 of the block diagram 200 of the entity system 102.

In some embodiments, the platform upgrade application 310 may comprise computer-readable instructions associated with building a platform upgrade, or the computer-readable instructions associated with building a platform upgrade may be stored in the processing datastore 314. More specifically, the platform upgrade application 310 may be structured to facilitate the user in building a proposed upgrade to one or more of the platforms operated by the entity system 102. Thus, in some embodiments, the platform upgrade application 310 may be structured as one or more frameworks or architectures that allow the user or a group of users to build the proposed upgrade, in whole or in part, such by facilitating the writing and compiling of scripts that will form the proposed upgrade. For example, while the environment 100 shown in FIG. 1 shows a single user device 106, in some embodiments the environment 100 may include a number of user devices 106, each associated with a user working on building the platform upgrade via the platform upgrade application 310 of the user device 106. In some embodiments, the platform upgrade application 310 comprises computer-readable instructions that, when executed by the processing device 304, cause the processing device 304 to perform one or more functions and/or transmit control instructions to other components or devices to build or facilitate the building of a platform upgrade.

It should also be understood that, in some cases, the platform upgrade application 310 may be implemented as a centralized module as shown in FIG. 3, while, in other cases, the platform upgrade application 310 may be implemented as a series of connected applications, frameworks, architectures, and/or the like that together allow the user to build the system upgrade in whole or in part. Further, in some cases, the platform upgrade application 310 may be or include one or more applications, frameworks, architectures, and/or the like that can be used to create upgrades or other computer-readable code for a variety of platforms and/or functionalities, and/or, in some cases, the platform upgrade application 310 may be or include one or more applications, frameworks, architectures, and/or the like that can be used to create upgrades specifically for the platform(s) of the entity system 102.

In some embodiments, the evaluation check application 312 may comprise computer-readable instructions associated with performing one or more steps for checking the evaluation of a proposed upgrade to one or more platforms of the entity system 102, where the evaluation and the process of preparing the evaluation is described in further detail below with reference to the deployment evaluation system 104. Alternatively, in some embodiments, the computer-readable instructions associated with performing the one or more steps for checking the evaluation of a proposed upgrade may be stored in the processing datastore 314. In some embodiments, the evaluation check application 312 comprises computer-readable instructions that, when executed by the processing device 304, cause the processing device 304 to perform one or more functions and/or transmit control instructions to other components or devices to perform the one or more steps for checking the evaluation of a proposed upgrade. In some cases, the evaluation check application 312 may be implemented through an existing application, such as through a web browser that the user can use to access an intranet site through which the evaluation can be displayed. In other cases, the evaluation check application 312 may be implemented as a specialized application, such as an application specially designed for facilitating a user in checking the evaluation of a proposed upgrade. The evaluation displayed to the user via the evaluation check application 312 may include a trust score, a breakdown of the trust score, a deployment report, and/or the like, as described in further detail below. For example, the evaluation displayed to the user via the evaluation check application 312 may include one more GUIs similar to the interface shown in FIG. 7, which is also described in further detail below.

FIG. 4 illustrates a block diagram 400 of the deployment evaluation system 104, in accordance with some embodiments of the invention. As illustrated in FIG. 4, the deployment evaluation system 104 may include a communication device 402; a processing device 404; and a memory device 406 having a natural language synthesis application 410, a trust score application 412, an active code segregator application 414, an experiences interpreter application 416, and a processing datastore 418 stored therein. As shown, the processing device 404 is operatively connected to and configured to control and cause the communication device 402 and the memory device 406 to perform one or more functions. In some embodiments, the natural language synthesis application 410, the trust score application 412, the active code segregator application 414, and/or the experiences interpreter application 416 comprises computer-readable instructions or computer-readable code that when executed by the processing device 404 cause the processing device 404 to perform one or more functions. For example, the natural language synthesis application 410, the trust score application 412, the active code segregator application 414, and/or the experiences interpreter application 416 may include computer-readable program code having one or more executable portions. It will be understood that the natural language synthesis application 410, the trust score application 412, the active code segregator application 414, and/or the experiences interpreter application 416 may be executable to initiate, perform, complete, and/or facilitate one or more portions of any embodiments described and/or contemplated herein.

The communication device 402 may generally include a modem, server, transceiver, and/or other device for communicating with other devices on the network 101. In some embodiments, the communication device 402 may be a communication interface having one or more communication devices configured to communicate with one or more devices on the network 101, such as the entity system 102, the user device 106, and the proposed upgrade database 108. As such, the communicative connection of the communication device 402 may be a wired or wireless connection similar to the implementation of the communication device 202 of the block diagram of the entity system 102.

Referring to the deployment evaluation system 104 illustrated in FIG. 4, the processing device 404 may generally refer to a device or combination of devices having circuits used for implementing the communication and/or logic functions of the processing device 404. In this way, the processing device 404 may be configured similarly to the processing device 204 of the block diagram 200 of the entity system 102. Additionally, the processing device 404 may further include functionality to operate one or more software programs based on computer-readable instructions 408 thereof, which may be stored in the memory device 406, such as the natural language synthesis application 410, the trust score application 412, the active code segregator application 414, and the experiences interpreter application 416. The processing device 404 may also be configured to use the network communication interface of the communication device 402 to transmit and/or receive data and/or commands to and/or from the other devices/systems connected to the network 101, similar to the processing device 204 of the entity system 102.

The memory device 406 within the deployment evaluation system 104 may generally refer to a device or combination of devices that store one or more forms of computer-readable media for storing data and/or computer-executable program instructions. For example, the memory device 406 may include any computer memory that provides an actual or virtual space to temporarily or permanently store data and/or commands provided to the processing device 404 when it carries out the functions described herein, similar to the memory device 206 of the block diagram 200 of the entity system 102.

The deployment evaluation system 104 may further include an evaluation data repository 420 comprising evaluation data 422. The processing device 404 may utilize the evaluation data 422 to evaluate the likelihood of success in deploying the proposed upgrade that is stored in the proposed upgrade database 108 to one or more platforms of the entity system 102. The processing device 404 may further utilize the evaluation data 422 to determine a deployment plan for the proposed upgrade. In this way, in some embodiments, the evaluation data 422 may include data about the platform(s) of the entity system 102 to be upgraded, such as data about the computer-readable code of the platform(s), metadata about the platform(s), and data about the operation of the platform(s), gathered from the infrastructure platform(s) 210 and/or the platform data 220 of the block diagram 200 of the entity system 102. Similarly, in some embodiments, the evaluation data 422 may include data about the proposed upgrade, such as data about the computer-readable code of the proposed upgrade, metadata about the proposed upgrade, and data about the predicted and/or tested operation of the proposed upgrade, gathered from the proposed upgrade database 108. Alternatively, in some embodiments, the deployment evaluation system 104 may not gather data about the platform(s) and the proposed upgrade and may instead use the data directly stored by the infrastructure platform(s) 210 and the platform data 220 of the block diagram 200 of the entity system 102 and stored by the proposed upgrade database 108.

Alternatively, or additionally, in some embodiments, the evaluation data 422 may include data created by the natural language synthesis application 410, the trust score application 412, the active code segregator application 41, and/or the experiences interpreter application 416. For example, the evaluation data 422 may include deployment reports on proposed upgrades generated by the natural language synthesis application 410, trust scores generated by the trust score application 412, identifications of active versus inactive code on the platform(s) to be upgraded that are determined by the active code segregator application 414, and the experiences documented by the experiences interpreter application 416, as discussed in further detail below.

In some embodiments, the natural language synthesis application 410 may comprise computer-readable instructions associated with one or more natural language synthesis steps, or the computer-readable instructions associated with one or more natural language synthesis steps may be stored in the processing datastore 418. The natural language synthesis application 410 may be embodied within one or more of the trust score application 412, active code segregator application 414, or experiences interpreter application 416, in some instances, or one or more of the trust score application 412, active code segregator application 414, or experiences interpreter application 416 may be embodied within the natural language synthesis application 410, in some instances. In some embodiments, the natural language synthesis application 410 comprises computer-readable instructions that, when executed by the processing device 404, cause the processing device 404 to perform one or more functions and/or transmit control instructions to other components or devices to perform the one or more natural language synthesis steps described herein.

These natural language synthesis steps may include using natural language processing to evaluate the computer-readable code of the proposed upgrade and the computer-readable code of the infrastructure platform(s) of the entity system 102 that are to be upgraded. For example, in some embodiments, the natural language synthesis application 410 may be trained through machine-learning to parse executable commands, permissions, database connections, compatibility information, and the like from computer-readable code. As an illustration, the natural language synthesis application 410 may be provided with a series of computer-readable codes containing features such as executable commands, permissions, database connections, compatibility information, and the like and given automatic and/or manual feedback on whether the natural language synthesis application 410 has correctly identified the features of the codes until the natural language synthesis application 410 reliably identifies the features of a given set of code.

More specifically, as described in further detail below, the natural language synthesis application 410 may, in some cases, identify the executable commands in the proposed upgrade code and the platform code using natural language processing, compare the commands used in the proposed upgrade code to the commands used in the platform code, and determine whether the commands of the proposed upgrade code match the commands of the existing infrastructure platform. In some cases, the natural language synthesis application 410 may identify the permissions in the proposed upgrade code and the platform code using natural language processing, compare the permissions used in the proposed upgrade code to the permissions used in the platform code, and determine whether the permissions of the proposed upgrade code match the permissions of the platform code. In some cases, the natural language synthesis application 410 may identify the database connections in the proposed upgrade code and the platform code using natural language processing, compare the database connections used in the proposed upgrade code to the database connections used in the platform code, and determine whether the database connections of the proposed upgrade code match the database connections of the platform code. In some cases, the natural language synthesis application 410 may determine a list of third-party products included in the existing infrastructure platform(s) to be upgraded; for each third-party product, determine whether the same version, a lesser version, or a higher version of the third-party product is included in the proposed upgrade; and if the same version or higher version of one or more third-party products are included in the proposed upgrade, determine whether the one or more third-party products are compatible with the code of the proposed upgrade.

Additionally, in some embodiments, the natural language synthesis application 410 is configured to build an execution plan or script using natural language processing. For example, in some cases, the natural language synthesis application 410 may build the execution plan using the results of the evaluation of the proposed upgrade code and the platform code (e.g., based on the results of comparing executable commands, permissions, external database connections, and compatibilities between the proposed upgrade code and the platform code). More specifically, the natural language synthesis application 410 may use the results of the evaluation to determine steps that should be performed to successfully deploy the proposed upgrade. The natural language synthesis application 410 is further configured to execute the execution plan to simulate deploying the proposed upgrade and assess the output of the simulation for success.

Based on the output of the simulation, the natural language synthesis application 410 may also generate a report that includes instructions on deploying the proposed upgrade. For example, the deployment report may include one or more recommended actions that the deployment evaluation system 104, the entity system 102, and/or a user should carry out to ensure that the deployment of the proposed upgrade is successful. These actions may include issues identified in the proposed upgrade that should be fixed before deployment, additional functionalities that the natural language synthesis application 410 recommends adding to the proposed upgrade, one or more recommended scripts that would facilitate deployment, and/or the like. In some cases, the natural language synthesis application 410 may be trained, using machine-learning and/or using preprogrammed phrases, to generate the report in plain language such that the report can be understood and followed by an individual who is not necessarily an expert in building and upgrading infrastructure platforms. This may be beneficial for the entity, as a report written in plain language may be followed by an employee with relatively less experience, thereby freeing up more experienced build engineers and developers may work on more complicated systems requiring their expertise.

In some embodiments, the trust score application 412 may comprise computer-readable instructions associated with one or more steps for generating a trust score, or the computer-readable instructions associated with one or more data gathering steps can be stored in the processing datastore 418. The trust score application 412 may be embodied within the natural language synthesis application 410, the active code segregator application 414, and/or the experiences interpreter application 416, in some instances, or the natural language synthesis application 410, active code segregator application 414, and/or the experiences interpreter application 416 may be embodied in the trust score application 412, in some instances. In some embodiments, the trust score application 412 comprises computer-readable instructions that, when executed by the processing device 404, cause the processing device 404 to perform one or more functions and/or transmit control instructions to other components or devices to perform the one or more steps for generating a trust score.

These steps for generating a trust score may include using the results from the natural language synthesis application 410 to predict a likelihood of success in deploying the proposed upgrade and generate a trust score indicating that predicted likelihood of success. In some embodiments, the trust score application 412 may be configured to generate the trust score by determining whether the proposed upgrade code meets a number of weighted criteria, where each weighted criterion is associated with a weighted value, and using the weighted values of the met criteria to generate the trust score. For example, the trust score application 412 may determine the trust score based on whether the executable commands of the proposed upgrade compared to the executable commands of the platform(s) to be upgraded meet certain criteria, whether the permissions of the proposed upgrade compared to the permissions of the platform(s) meet certain criteria, whether the external database connections of the proposed upgrade compared to the external database connections of the platform(s) meet certain criteria, and whether third-party products used in the platform(s) will likely be compatible with the third-party products used in the proposed upgrade according to certain criteria.

In some embodiments, the active code segregator application 414 may comprise computer-readable instructions associated with one or more code segregation steps, or the computer-readable instructions associated with the one or more code segregation steps may be stored in the processing datastore 418. The active code segregator application 414 may be embodied within the natural language synthesis application 410, the trust score application 412, and/or the experiences interpreter application 416, in some instances, or the natural language synthesis application 410, the trust score application 412, and/or the experiences interpreter application 416 may be embodied within the active code segregator application 414, in some instances. In some embodiments, the active code segregator application 414 comprises computer-readable instructions that, when executed by the processing device 404, cause the processing device 404 to perform one or more functions and/or transmit control instructions to other components or devices to perform the one or more code segregation steps described herein.

These code segregation steps may include, in response to the trust score of a proposed upgrade being above a threshold, using natural language processing to identify inactive code from active code in the existing infrastructure platform(s) to be upgraded. In some embodiments, the active code segregator application 414 may be trained through a similar machine-learning process as used for the natural language synthesis application 410 to parse executable commands, permissions, database connections, compatibility information, and the like from computer-readable code. The active code segregator application 414 may then use the parsed information to identify which scripts of the platform code are active and which scripts of the platform code are inactive. For example, the active code segregator application 414 may identify scripts that are no longer linked by executable commands to active code and are therefore inactive. As another example, the active code segregator application 414 may determine, using information stored in the platform data 220 of the data repository 214 of the entity system 102, whether each script of the platform code has been executed within a certain period of time, such as within the last five years. If a script has not been executed within the period of time, it may be classified as inactive.

The active code segregator application 414 may be further configured to generate or build, or help generate or build, an automation script for deploying the proposed upgrade. More specifically, the active code segregator application 414 may be configured to generate, in whole or in part, a script that executes the proposed upgrade onto the infrastructure platform(s) to be upgraded while isolating sections of inactive code of the platform(s) from the upgrade process such that the inactive code is not migrated to the upgraded platform(s). In some cases, the active code segregator application 414 may also use the deployment report generated by the natural language synthesis application 410 in creating the automation script for deploying the proposed upgrade. For instance, the active code segregator application 414 may use the report to determine a sequence of steps that should be carried out to successfully deploy the proposed upgrade. The active code segregator application 414 may also use feedback and inputs from a build engineer, which may also be prompted by the report, in creating the automation script.

In some embodiments, the experiences interpreter application 416 may comprise computer-readable instructions associated with one or more experience interpretation steps, or the computer-readable instructions associated with the one or more experience interpretation steps may be stored in the processing datastore 418. The experiences interpreter application 416 may be embodied within the natural language synthesis application 410, the trust score application 412, and/or the active code segregator application 414, in some instances, or the natural language synthesis application 410, the trust score application 412, and/or the active code segregator application 414 may be embodied within the experiences interpreter application 416, in some instances. In some embodiments, the experiences interpreter application 416 comprises computer-readable instructions that, when executed by the processing device 404, cause the processing device 404 to perform one or more functions and/or transmit control instructions to other components or devices to perform the one or more experience interpretation steps described herein.

These experience interpretation steps may include gathering information on the results from the natural language synthesis application 410, the trust score application 412, and the active code segregator application 414 in order to refine one or more of these applications. In some cases, if the trust score for a proposed upgrade is below a certain threshold, the experiences interpreter application 416 may identify all failure commands in the proposed upgrade, as well as associated scripts, parameters, configurations, and the like. The experiences interpreter application 416 may also run a repair process to fix some or all of the issues causing the low trust score. Similarly, if the trust score for a proposed upgrade is at or above a certain threshold but the proposed upgrade does not deploy successfully or deploys with one or more errors, the experiences interpreter application 416 may identify the post-deployment errors, as well as the issues in the proposed upgrade code causing the post-deployment errors. On the other hand, if the proposed upgrade is deployed successfully, the experiences interpreter application 416 may identify functions, scripts, configurations, and the like in the proposed upgrade that made the proposed upgrade successful. For example, the experiences interpreter application 416 may compare the successful upgrade to previous, less successful upgrades in the past to identify these successful functions, scripts, configurations, and the like.

The experiences interpreter application 416 may then use this information to help refine the natural language synthesis application 410, the trust score application 412, and/or the active code segregator application 414. As an illustration, the experiences interpreter application 416 may use gathered information to improve the natural language processing of the natural language synthesis application 410 by training the natural language synthesis application 410 to better identify executable commands, permissions, external database connections, and the like, or to prioritize the identification of certain executable commands, permissions, external database connections, and the like that have been associated with successful or unsuccessful upgrade deployments. As another illustration, the experiences interpreter application 416 may use the information to refine the process by which the trust score application 412 generates the trust score, such as by reweighing and/or modifying the criteria used to determine the trust score.

It should be understood that while in FIGS. 1, 2, and 4, the entity system 102 and the deployment evaluation system 104 are shown as separate systems, the entity system 102 and the deployment evaluation system 104 may, in some embodiments, be implemented partially or entirely as the same system. For example, the entity system 102 may be implemented as a series of networked servers that also host computer-readable code that performs the functions of the deployment evaluation system 104 as described above and in further detail below.

These features will now be described with respect to the process flow 500 of FIG. 5 and the process flow 600 of FIG. 6. Starting first with the process flow 500 of FIG. 5, the deployment evaluation system 104 first receives a proposed upgrade, as indicated by block 502. For example, the deployment evaluation system 104 may be directed by a user to a proposed upgrade stored in the proposed upgrade database 108. After receiving the proposed upgrade, the deployment evaluation system 104 performs a natural language synthesis of the proposed upgrade, as indicated by block 504. The synthesis may include using natural language processing to evaluate various aspects, functions, commands, and the like of the proposed upgrade compared to the infrastructure platform(s) to be upgraded. In some embodiments, the deployment evaluation system 104 may be trained in using natural language processing as described above with reference to the natural language synthesis application 410 of FIG. 4, such as by being trained using machine-learning to identify certain aspects of computer-readable code.

In various embodiments, the natural language synthesis includes performing the high-level process flow 600 of FIG. 6. Thus, in some embodiments, as part of performing the natural language synthesis, the deployment evaluation system 104 may interpret and compare a list of commands used in the infrastructure platform(s) to be upgraded and a list of commands used in the proposed upgrade, as indicated by block 602. In some cases, the deployment evaluation system 104 may compare the commands used in the code of the proposed upgrade to the commands used in the existing infrastructure platform(s), determine whether the commands of the proposed upgrade code match the commands of the existing infrastructure platform(s), and, if one or more commands of the proposed upgrade code do not match the commands of the platform(s), determine how frequently the one or more non-matching commands are used in the proposed upgrade code. For example, the deployment evaluation system 104 may determine in what number of scripts and in what percentage of scripts of the proposed upgrade code a command that does not match a command of the existing platform(s) is used.

As indicated by block 604, the deployment evaluation system 104 may also identify and compare permissions in the existing infrastructure platform(s) and the proposed upgrade. In some cases, the deployment evaluation system 104 may compare commands used in the code of the proposed upgrade to commands used in the existing infrastructure platform(s), determine whether permissions of the proposed upgrade commands match permissions of the existing platform commands, and, if one or more permissions of the proposed upgrade commands do not match the permissions of the existing infrastructure platform commands, determine how frequently the one or more permissions are used in the proposed upgrade code. As an example, the deployment evaluation system 104 may determine in what percentage of scripts of the proposed upgrade code a permission that does not match any of the permissions of the existing platform(s) is used.

As indicated by block 606, the deployment evaluation system 104 may further identify, test, and compare external database connections in the existing infrastructure platform(s) and the proposed upgrade. In some cases, the deployment evaluation system 104 may compare database connections in the code of the proposed upgrade to database connections in the existing infrastructure platform(s), determine whether the database connections of the proposed upgrade code match the database connections of the existing infrastructure platform, and, if one or more database connections of the proposed upgrade code do not match the database connections of the existing infrastructure platform(s), determine how many of the proposed upgrade code database connections do not match a database connection of the existing platform(s). To illustrate, the deployment evaluation system 104 may determine what percentage of the external database connections of the proposed upgrade do not match any of the database connections of the existing platform(s). In some cases, the deployment evaluation system 104 may also test each of the external database connections of the proposed upgrade to determine if the external databases are correctly working and responding.

As indicated by block 608, the deployment evaluation system 104 may additionally perform a compatibility check between the existing infrastructure platform(s) and the proposed upgrade. In some cases, the deployment evaluation system 104 may determine a list of third-party products that are included on the existing infrastructure platform(s) and, for each third-party product, determine whether the same version, a lesser version, or a higher version of the third-party product is included in the proposed upgrade. If the same version or a higher version of one or more third-party products is included in the proposed upgrade, the deployment evaluation system 104 may determine whether the one or more third-party products are compatible with the code of the proposed upgrade. Further, if at least one of the one or more third-party products is not compatible with the code of the proposed upgrade, the deployment evaluation system 104 may determine how frequently the at least one third-party product is used in the proposed upgrade code compared to how frequently the at least one third-party product is used in the existing infrastructure platform. For example, the deployment evaluation system 104 may determine whether each non-compatible product is used more frequently or less frequently in the proposed upgrade compared to the platform(s) to be upgraded.

As indicated by block 610, the deployment evaluation system 104 may then build a natural language processing execution plan. The deployment evaluation system 104 may use the natural language processing execution plan to simulate the deployment of the proposed upgrade. In some embodiments, the deployment evaluation system 104 may use the results of blocks 602, 604, 606, and 608 to build the execution plan. For example, the deployment evaluation system 104 may determine executable scripts that should be evaluated, permissions that should be tested, external database connections that should be tested, and compatibilities that should be tested based on the results of blocks 602, 604, 606, and 608. The deployment evaluation system 104 may also determine steps or scripts that should be executed in order to potentially deploy the proposed upgrade to the infrastructure platform(s) to be upgraded.

As indicated by block 612, the deployment evaluation system 104 may accordingly execute the natural language processing execution plan. As an illustration, this may include testing executable commands of the proposed upgrade code to determine whether they produce a desired result, testing permissions of the proposed upgrade code to determine whether they are working, testing external database connections to make sure the databases are working correctly and responding to the proposed upgrade code, determining whether versions of third-party products included in the platform(s) and the proposed upgrade are compatible with each other, and/or the like. The deployment evaluation system 104 may also analyze the results of the execution plan to determine to what extent the simulation of the proposed upgrade was successful. The deployment evaluation system 104 may further analyze the results of the execution plan to determine what improvements could be made to the proposed upgrade code to maximize the chances of its deployment being successful.

Returning to the process flow 500, after performing the natural language synthesis as discussed above, the deployment evaluation system 104 generates a deployment report, as indicated by block 508. In some embodiments, the deployment report may include steps for improving the proposed upgrade and/or steps for deploying the proposed upgrade. Further, in some cases, the report may include the results of the natural language processing execution plan and any proposed improvements to the proposed upgrade code determined at block 612 of the process flow 600. In some embodiments, the deployment evaluation system 104 may also generate the report in plain, less technical language. For example, the deployment evaluation system 104 may use preprogrammed phrases or sentences that depend on various proposals and outcomes of the execution plan, and/or the deployment evaluation system 104 may use machine-learning to develop natural language for the report. As indicated by block 508, the deployment evaluation system 104 then transmits the report to a build engineer. For example, the deployment evaluation system 104 may generate a GUI or a series of GUIs for displaying the report that the deployment evaluation system 104 transmits to the user device 106. As another example, the deployment evaluation system 104 may email the report to the build engineer that submitted the proposed upgrade.

Additionally, after performing the natural language synthesis, the deployment evaluation system 104 generates a trust score for the proposed upgrade, as indicated by block 510. In some embodiments, the deployment evaluation system 104 generates the trust score by using the results of the natural language synthesis to determine whether the proposed upgrade meets various weighted criteria, where each criterion is associated with a numerical value. The numerical values of the met weighted criteria are then used to determine the trust score.

To illustrate, in some embodiments, the deployment evaluation system 104 may evaluate the proposed upgrade relative to several sets of criteria. For instance, the deployment evaluation system 104 may evaluate whether the proposed upgrade meets a first set of criteria relating to the executable commands of the proposed upgrade. If the executable commands used in the proposed upgrade are the same as the executable commands used in the platform(s) to be upgraded, the deployment evaluation system 104 may assign a full score for the first set of criteria (e.g., "value A"). If one or more executable commands used in the proposed upgrade are not the same as the executable commands of the platform(s), the deployment evaluation system 104 may instead determine how frequently the non-matching executable command(s) are used in the proposed upgrade.

More specifically, as an example, if only one command of the proposed upgrade is non-matching, and the one non-matching command is used in less than a certain percentage of the proposed upgrade scripts and less than a certain number of the proposed upgrade scripts, the deployment evaluation system 104 may assign a "value B" score for the first set of criteria. If the non-matching command is used in the certain percentage or more than the certain percentage of proposed upgrade scripts and/or is used in the certain number or more than the certain number of proposed upgrade scripts, the deployment evaluation system 104 may assign a "value C" score for the first set of criteria. If two commands of the proposed upgrade are non-matching, and the two non-matching commands are used in less than the certain percentage of proposed upgrade scripts and less than the certain number of the proposed upgrade scripts, the deployment evaluation system 104 may assign a "value D" score for the first set of criteria. If the two non-matching commands are used in the certain percentage or more than the certain percentage of proposed upgrade scripts and/or the certain number or more than the certain number of proposed upgrade scripts, the deployment evaluation system 104 may assign a "value E" score for the first set of criteria. If, instead, more than two of the commands of the proposed upgrade are non-matching commands, and the non-matching commands are used in less than the certain percentage of proposed upgrade scripts and less than the certain number of proposed upgrade scripts, the deployment evaluation system 104 may assign a "value F" score for the first set of criteria. If the non-matching commands are otherwise used in the certain percentage or more than the certain percentage of proposed upgrade scripts and/or the certain number or more than the certain number of proposed upgrade scripts, the deployment evaluation system 104 may assign a "value G" score for the first set of criteria. The value A-G scores may be configured such that they decrease in value, such as linearly or in a stepwise fashion. For instance, value A may be the highest score, value G may be the lowest score, value C may be the same as value D, value E may be the same as value F, and so on.

The deployment evaluation system 104 may also evaluate whether the proposed upgrade meets a second set of criteria relating to the permissions of the proposed upgrade. If the permissions used in the proposed upgrade are the same as the permissions used in the platform(s) to be upgraded, the deployment evaluation system 104 may assign a full score for the second set of criteria (e.g., "value H"). If the permissions used in the proposed upgrade are not the same as the permissions of the platform(s), the deployment evaluation system 104 may instead determine how frequently the non-matching permission(s) are used in the proposed upgrade. As an example, if less than a first threshold of scripts use at least one non-matching permission, the deployment evaluation system 104 may assign a "value I" score for the second set of criteria. If between the first threshold and a second, higher threshold of scripts use at least one non-matching permission, the deployment evaluation system 104 may assign a "value J" score for the second set of criteria. If between the second threshold and a third, higher threshold of scripts use at least one non-matching permission, the deployment evaluation system 104 may assign a "value K" score for the second set of criteria. Finally, if more than the third threshold of scripts use at least one non-matching permission, the deployment evaluation system 104 may assign a "value L" score for the second set of criteria. The value H-L scores may be configured, for example, such that they decrease in a linear or exponential fashion.

The deployment evaluation system 104 may further evaluate whether the proposed upgrade meets a third set of criteria relating to the external database connections of the proposed upgrade. If the database connections used in the proposed upgrade are the same as the database connections used in the platform(s) to be upgraded, the deployment evaluation system 104 may assign a full score for the third set of criteria (e.g., "value M") for the third set of criteria. If the database connections used in the proposed upgrade are not the same as the database connections of the platform(s), the deployment evaluation system 104 may instead determine a ratio of the database connections in the proposed upgrade that do not match any of the database connections in the platform(s) to the total number of database connections in the proposed upgrade. For instance, if less than a first percentage of the proposed upgrade database connections are non-matching, the deployment evaluation system 104 may assign a "value N" score for the third set of criteria. If between the first percentage and a second, higher percentage of proposed upgrade database connections are non-matching, the deployment evaluation system 104 may assign a "value O" score for the third set of criteria. If between the second percentage and a third, higher percentage of proposed upgrade database connections are non-matching, the deployment evaluation system 104 may assign a "value P" score for the third set of criteria. Finally, if more than the third percentage of proposed upgrade database connections are non-matching, the deployment evaluation system 104 may assign a "value Q" score for the third set of criteria. The value M-Q scores may be configured, for example, such that they decrease in a linear or exponential fashion, similar to the value H-L scores. In some implementations, the deployment evaluation system 104 may also test the database connections and count a non-working database connection as a "non-matching" connection for the purposes of determining the trust score.

In addition, the deployment evaluation system 104 may evaluate whether third-party products used in the proposed upgrade are compatible with third-party products used in the platform(s) to be upgraded as part of a fourth set of criteria. As an example, the deployment evaluation system 104 may determine a list of the third-party products included in the existing infrastructure platform(s) to be upgraded and a list of the third-party products included in the proposed upgrade. These lists may contain, for instance, all software and clients installed on the existing platform(s) and all software and clients to be included in the proposed upgrade. In some cases, the third-party software products may include software products created by the entity that have different versions and may exist separately or may be separately built onto the existing infrastructure platform(s) in addition to software products released by groups other than the entity. The deployment evaluation system 104 may then compare the third-party products of the platform(s) and the proposed upgrade to determine whether the same version, a lesser version, or a higher version of each third-party product used in the platform(s) is included in the proposed upgrade.

If the same version for each third-party product is installed in the proposed upgrade, then the deployment evaluation system 104 may verify whether the third-party products of the platform(s) are compatible with the third-party products of the proposed upgrade. If all third-party products are compatible, the deployment evaluation system 104 may assign a full score for the fourth set of criteria (e.g., "value R"). If one or more of the third-party products of the platform(s) are not compatible with the third-party products of the proposed upgrade, the deployment evaluation system 104 may determine whether the one or more third-party products are used more frequently in the proposed upgrade compared their use in the existing platform(s). If the one or more third-party products are used less frequently in the proposed upgrade, the deployment evaluation system 104 may assign a "value S" score for the fourth set of criteria. If, instead, the one or more third-party products are used more frequently in the proposed upgrade, the deployment evaluation system 104 may assign a "value T" score for the fourth set of criteria.

The deployment evaluation system 104 may make similar determinations if a higher version for one or more of the third-party products is installed in the proposed upgrade. As such, the deployment evaluation system 104 may determine whether the third-party products of the platform(s) are compatible with the third-party products of the proposed upgrade. If all third-party products are compatible, the deployment evaluation system 104 may assign the full value R score for the fourth set of criteria. If one or more of the third-party products of the platform(s) are not compatible, the deployment evaluation system 104 may then determine if the non-compatible product(s) are used more frequently in the proposed upgrade compared to their use in the existing platform(s). If the one or more third-party products are used less frequently in the proposed upgrade, the deployment evaluation system 104 may assign a "value U" score for the fourth set of criteria, while if the one or more third-party products are instead used more frequently in the proposed upgrade, the deployment evaluation system 104 may instead assign a higher "value V" score for the fourth set of criteria. In some cases, the value S score may be the same as the value U score, and the value T score may be the same as the value V score.

On the other hand, if the deployment evaluation system 104 determines that a lesser version of at least one third-party product of the platform(s) is installed in the proposed upgrade, or if at least one third-party product of the platform(s) is missing from the proposed upgrade, the deployment evaluation system 104 may assign a minimum "value W" score for the fourth set of criteria, such as a score of zero. In some cases, the value R-W scores may be configured such that they decrease, for example, linearly or exponentially.

Once the deployment evaluation system 104 determines which criterion from each set of weighted criteria the proposed update meets, the deployment evaluation system 104 uses the assigned values from the met criteria to determine the trust score, such as by summing the assigned values to produce the trust score. In some cases, the numerical values assigned for the various criteria are configured such that each set of criteria is weighted compared to the other sets of criteria. As an example, values A-G may be scored out of 100 but then multiplied by a weight such that the assigned value only comprises, for instance, 20% of the trust score. For example, the first set of criteria may make up 20% of the trust score, the second set of criteria may make up 10% of the trust score, the third set of criteria may make up 30% of the trust score, and the fourth set of criteria may make up 40% of the trust score.

Once the deployment evaluation system 104 has generated the trust score for the proposed upgrade, the deployment evaluation system 104 determines whether the trust score is above (or, in some cases, equal to or above) a certain threshold, as indicated by block 512. For example, the threshold may be set to ensure that only proposed upgrades with a high likelihood of success are deployed. If the trust score is below the threshold, the deployment evaluation system 104 may perform a repair process, as indicated by block 514. The repair process may include cataloguing issues in the proposed upgrade that were identified from the the natural language synthesis and/or generation of the trust score. To illustrate, the deployment evaluation system 104 may identify all failed commands and their respective scripts, parameters, configurations, and the like that are present on the proposed upgrade and/or platform(s) to be upgraded. In some cases, for instance, the deployment evaluation system 104 may identify why the proposed upgrade met certain criteria used to generate the trust score. The deployment evaluation system 104 may then attempt to repair these issues and/or transmit a list of the issues to a build engineer. As an example, if the proposed upgrade scored poorly because the proposed upgrade includes permissions that are not present in the existing platform(s), the deployment evaluation system 104 may verify that each of the permissions added to the proposed upgrade is working correctly and therefore should not pose an issue when the platform(s) are upgraded.

On the other hand, if the trust score is above the threshold, the deployment evaluation system 104 determines whether the platform(s) to be upgraded include inactive code, as indicated by block 516. In some embodiments, as discussed above with reference to the active code segregator application 414 of FIG. 4, the deployment evaluation system 104 may use natural language processing to identify scripts, executable commands, and the like that are inactive and/or have not been used for a certain period of time. If the platform(s) contain inactive code, the deployment evaluation system 104 may isolate the active code from the inactive code, as indicated by block 518. For example, the deployment evaluation system 104 may identify sections of active code that should be migrated to the new environment when the platform(s) are upgraded by the proposed upgrade, as opposed to sections of inactive code that should not be moved over with the upgrade.

After isolating the active code, the deployment evaluation system 104 generates or builds an automation script for deploying the proposed upgrade to create an upgraded infrastructure platform or platforms, as indicated by block 520. Alternatively, if the platform(s) do not include inactive code, the deployment evaluation system 104 may proceed directly to generating the automation script at block 520. Generating the automation script may include incorporating steps, improvements, and the like that were identified in the deployment report created at block 506. For example, the deployment evaluation system 104 may automatically add to or update the proposed upgrade according to the proposed steps, improvements, and the like in the report. In some cases, the deployment evaluation system 104 may also receive feedback from a build engineer that the deployment evaluation system 104 incorporates into the automation script, as indicated by block 522. As an illustration, a build engineer, who may or may not be the same build engineer who received the deployment report at block 508, may provide updated proposed upgrade code that includes the proposed improvements indicated in the report to the deployment evaluation system 104. In some cases, the build engineer may also create the automation script, at least in part, based on the report, such as based on the deployment steps for the proposed upgrade outlined in the report. If applicable, the deployment evaluation system 104 further generates the build automation script such that the inactive code isolated at block 518 will be excluded when the proposed upgrade is executed. Thus, the upgraded infrastructure platform(s) created from the proposed upgrade should include a minimum of inactive code.

As indicated by block 524, the deployment evaluation system 104 then executes the build automation script to attempt to deploy the proposed upgrade and create the upgraded infrastructure platform(s). As indicated by block 526, the deployment evaluation system 104 determines whether the deployment of the proposed upgrade was successful. If the deployment was successful, the deployment evaluation system 104 may capture and interpret the experiences of the process for evaluating and deploying the proposed upgrade, as indicated by block 530. For instance, the deployment evaluation system 104 may determine one or more parameters relating to the successful deployment, such as the steps, the scripts, the executable commands, the permissions, and the like of the proposed upgrade that made the proposed upgrade successful. This may include comparing the proposed upgrade to previous, less successful upgrades.

If the deployment was not successful, including if the proposed upgrade was able to be carried out but incurred at least some post-deployment errors, the deployment evaluation system 104 identifies the post-deployment errors, as indicated by block 528. At block 530, the deployment evaluation system 104 then uses the post-deployment errors to capture and interpret the experiences of unsuccessfully or partially successfully launching the proposed upgrade. To illustrate, the deployment evaluation system 104 may determine one or more parameters that caused the errors (e.g., executable commands being unable to be carried out, denied permissions, issues with connecting to external databases, compatibility issues, and/or the like) and how these errors could be prevented in the future. As shown in FIG. 5, the deployment evaluation system 104 also makes a similar determination for a proposed upgrade in response to the trust score being below the threshold at block 512 and the repair process being performed at block 514. For example, the deployment evaluation system 104 may identify one or more parameters that caused the trust score to be below the threshold and steps, scripts, executable commands, permissions and the like associated with the parameters causing the low trust score.

As indicated by block 532, the deployment evaluation system 104 refines various blocks of the process flow 500, including the natural language synthesis performed at block 504, the trust score generated at block 510, and/or the active/inactive code isolation process performed at block 518. In some cases, for instance, the deployment evaluation system 104 may use the experiences captured and interpreted at block 530 to train the deployment evaluation system 104 to more accurately identify pieces and/or functionalities of code as part of the natural language synthesis. The deployment evaluation system 104 may also uses these experiences to focus the natural language synthesis on the components of a proposed upgrade that are shown by the experiences to be more likely to cause failure or cause success than other components. In some cases, the deployment evaluation system 104 may use the experiences of block 530 to reweigh and/or change the criteria used to determine the trust score. For example, the deployment evaluation system 104 may identify proposed upgrade functionalities or lack of functionalities that are more likely to cause a successful or unsuccessful platform upgrade. The deployment evaluation system 104 may then reweigh the criteria used to generate the trust score such that the deployment evaluation system 104 assigns higher trust scores to proposed upgrades that include functionalities that have been present in historically successful upgrades and lower trust scores to proposed upgrades that lack the functionalities present in historically successful upgrades and/or include components or functionalities that have been present in historically unsuccessful upgrades. In some cases, the deployment evaluation system 104 may use the experiences of block 530 to determine how effectively the deployment evaluation system 104 migrated active code with the proposed upgrade while isolating away inactive code. For example, the deployment evaluation system 104 may determine, using natural language synthesis, whether the upgraded platform(s) include executable commands that do not perform functions. As another example, the deployment evaluation system 104 may determine, from post-deployment errors, whether the upgraded platform(s) are missing executable commands based on broken links from other scripts. The deployment evaluation system 104 may use this data to improve the process of identifying inactive code accordingly.

It should be understood that the process flows 500 and 600 are intended to be exemplary and that other processes may be used to synthesize a proposed upgrade, generate a trust score, isolate inactive code from active code, execute the proposed upgrade, and capture and interpret the experiences of the upgrade. For instance, the trust score may be generated using different criteria than the exemplary criteria discussed above. Alternatively, the trust score may be generated using a different process, such as by quantifying various aspects of the proposed upgrade code (e.g., counting the number of executable commands, permissions, external database connections, and/or the like), determining a likelihood that the various aspects will be successfully implemented in the upgrade, multiplying the likelihood of each aspect by the quantification for each aspect, and summing the results.

FIG. 7 illustrates a representation of a GUI 700 for display on a user device (e.g., the user device 106), in accordance with some embodiments of the invention. For example, the user may request to view the GUI 700 to understand why a proposed upgrade received a certain trust score. Alternatively, the GUI 700 may be included in a deployment report generated by the deployment evaluation system 104. The example GUI 700 includes a header 702 identifying the proposed upgrade. The GUI 700 then includes the trust score for the proposed upgrade in a sub-header 704. Underneath the sub-header 704 is a breakdown 706 of the trust score. For instance, as shown, the breakdown 706 may include a list of different sets of criteria used to determine the trust score (e.g., in FIG. 7, a first set of criteria listed under "Trust Score Section 1", a second set of criteria listed under "Trust Score Section 2", a third set of criteria listed under "Trust Score Section 3", and the like). The criterion for each set that the proposed upgrade meets is bolded, along with the score associated with the criterion. The breakdown 706 also includes a running total of the overall score for the proposed upgrade. As such, the GUI 700 demonstrates to the user why the proposed upgrade received the trust score that it did. The user may be able to scroll down the GUI 700 to see all of the criteria and scores assigned to the proposed upgrade.

It should be understood that the GUI 700 illustrated in FIG. 7 is intended to be exemplary. Additional and alternative GUIs may be generated by the deployment evaluation system 104 and displayed by a user device 106 to communicate information about the natural language synthesis, the trust score, the captured experiences, and/or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the continuous authentication and encryption processes and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive of, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for synthesizing and building infrastructure platforms, the system comprising:
   a memory device with computer-readable program code stored thereon;
   a communication device; and
   a processing device operatively coupled to the memory device and communication device, wherein the processing device is configured to execute the computer-readable program code to:
      perform a natural language synthesis of a proposed upgrade to one or more existing infrastructure platforms, wherein the natural language synthesis comprises analyzing, using natural language processing, code of the proposed upgrade by:
         comparing database connections in the code of the proposed upgrade to database connections in the one or more existing infrastructure platforms;
         determining whether the database connections of the proposed upgrade code match the database connections of the one or more existing infrastructure platforms; and
         if one or more database connections of the proposed upgrade code do not match the database connections of the one or more existing infrastructure platforms, determining a ratio of the one or more database connections to a total number of database connections of the proposed upgrade code;
      generate a trust score from results of the natural language synthesis, wherein the trust score indicates a predicted likelihood of success for the proposed upgrade;
      in response to the trust score being above a threshold, identify, using natural language processing, inactive code in the one or more existing infrastructure platforms;
      generate a build automation script for deploying the proposed upgrade to create one or more upgraded infrastructure platforms that exclude the inactive code;
      execute the build automation script to simulate development of the proposed upgrade including one or more of: testing executable commands, testing permissions, and/or testing external database connections;
      capture data from a result of the build automation script execution; and use the result of the build automation script execution and the captured data to refine the natural language synthesis to generate a deployment report in plain language.

2. The system of claim 1, wherein the processing device is further configured to:
build an execution plan from the results of the natural language synthesis; and
generate a report from the execution plan, wherein the report includes instructions on deploying the proposed upgrade written in plain language, and wherein the build automation script is at least partially based on the report.

3. The system of claim 1, wherein generating the trust score from the results of the natural language synthesis comprises:
determining, based on the results of the natural language synthesis, whether the code of the proposed upgrade meets a plurality of weighted criteria, wherein each weighted criterion is associated with a weighted value; and
using the weighted values of the met criteria to generate the trust score.

4. The system of claim 1, wherein capturing the data from the result of the build automation script execution comprises, in response to one or more post-deployment errors in the deployment of the proposed upgrade, capturing the one or more post-deployment errors and one or more parameters of the proposed upgrade that caused the one or more post-deployment errors.

5. The system of claim 1, wherein capturing the data from the result of the build automation script execution comprises, in response to the deployment of the proposed upgrade being a success, capturing one or more parameters of the proposed upgrade relating to the success.

6. A computer-implemented method for synthesizing and building infrastructure platforms, the method comprising:
performing a natural language synthesis of a proposed upgrade to one or more existing infrastructure platforms, wherein the natural language synthesis comprises analyzing, using natural language processing, code of the proposed upgrade by:
comparing database connections in the code of the proposed upgrade to database connections in the one or more existing infrastructure platforms;
determining whether the database connections of the proposed upgrade code match the database connections of the one or more existing infrastructure platforms; and
if one or more database connections of the proposed upgrade code do not match the database connections of the one or more existing infrastructure platforms, determining a ratio of the one or more database connections to a total number of database connections of the proposed upgrade code;
generating a trust score from results of the natural language synthesis, wherein the trust score indicates a predicted likelihood of success for the proposed upgrade;
in response to the trust score being above a threshold, identifying, using natural language processing, inactive code in the one or more existing infrastructure platforms;
generating a build automation script for deploying the proposed upgrade to create one or more upgraded infrastructure platforms that exclude the inactive code;

executing the build automation script to simulate development of the proposed upgrade including one or more of: testing executable commands, testing permissions, and/or testing external database connections;
capturing data from a result of the build automation script execution; and
using the result of the build automation script execution and the captured data to refine the natural language synthesis to generate a deployment report in plain language.

7. The computer-implemented method of claim 6, further comprising:
building an execution plan from the results of the natural language synthesis; and
generating a report from the execution plan, wherein the report includes instructions on deploying the proposed upgrade written in plain language, and wherein the build automation script is at least partially based on the report.

8. The computer-implemented method of claim 6, wherein generating the trust score from the results of the natural language synthesis comprises:
determining, based on the results of the natural language synthesis, whether the code of the proposed upgrade meets a plurality of weighted criteria, wherein each weighted criterion is associated with a weighted value; and
using the weighted values of the met criteria to generate the trust score.

9. The computer-implemented method of claim 6, wherein capturing the data from the result of the build automation script execution comprises, in response to one or more post-deployment errors in the deployment of the proposed upgrade, capturing the one or more post-deployment errors and one or more parameters of the proposed upgrade that caused the one or more post-deployment errors.

10. The computer-implemented method of claim 6, wherein capturing the data from the result of the build automation script execution comprises, in response to the deployment of the proposed upgrade being a success, capturing one or more parameters of the proposed upgrade relating to the success.

11. A computer program product for synthesizing and building infrastructure platforms with at least one non-transitory computer-readable medium having computer-readable program code portions embodied therein, the computer-readable program code portions comprising:
an executable portion configured for performing a natural language synthesis of a proposed upgrade to one or more existing infrastructure platforms, wherein the natural language synthesis comprises analyzing, using natural language processing, code of the proposed upgrade by:
comparing database connections in the code of the proposed upgrade to database connections in the one or more existing infrastructure platforms;
determining whether the database connections of the proposed upgrade code match the database connections of the one or more existing infrastructure platforms; and
if one or more database connections of the proposed upgrade code do not match the database connections of the one or more existing infrastructure platforms, determining a ratio of the one or more database connections to a total number of database connections of the proposed upgrade code;

an executable portion configured for generating a trust score from results of the natural language synthesis, wherein the trust score indicates a predicted likelihood of success for the proposed upgrade;

an executable portion configured for, in response to the trust score being above a threshold, identifying, using natural language processing, inactive code in the one or more existing infrastructure platforms;

an executable portion configured for generating a build automation script for deploying the proposed upgrade to create one or more upgraded infrastructure platforms that exclude the inactive code;

an executable portion configured for executing the build automation script to simulate development of the proposed upgrade including one or more of: testing executable commands, testing permissions, and/or testing external database connections;

an executable portion configured for capturing data from a result of the build automation script execution; and an executable portion configured for using the result of the build automation script execution and the captured data to refine the natural language synthesis to generate a deployment report in plain language.

12. The computer-program product of claim 11, wherein the computer-readable program code portions further comprise:

an executable portion configured for building an execution plan from the results of the natural language synthesis; and an executable portion configured for generating a report from the execution plan, wherein the report includes instructions on deploying the proposed upgrade written in plain language, and wherein the build automation script is at least partially based on the report.

13. The computer-program product of claim 11, wherein the computer-readable program code portions further comprise:

an executable portion configured for determining, based on the results of the natural language synthesis, whether the code of the proposed upgrade meets a plurality of weighted criteria, wherein each weighted criterion is associated with a weighted value; and an executable portion configured for using the weighted values of the met criteria to generate the trust score.

14. The computer-program product of claim 11, wherein the executable portion configured for capturing the data from the result of the build automation script execution comprises, in response to one or more post-deployment errors in the deployment of the proposed upgrade, and an executable portion capturing the one or more post-deployment errors and one or more parameters of the proposed upgrade that caused the one or more post-deployment errors.

15. The computer-program product of claim 11, wherein capturing the data from the result of the build automation script execution comprises, in response to the deployment of the proposed upgrade being a success, capturing one or more parameters of the proposed upgrade relating to the success.

* * * * *